United States Patent
Upton et al.

(10) Patent No.: US 11,283,882 B1
(45) Date of Patent: Mar. 22, 2022

(54) SYSTEM AND METHOD FOR SOFTWARE SERVICES PLATFORM ARCHITECTURE FOR SUPPORTING STANDALONE SERVICES OR DEVELOPMENT ENVIRONMENTS

(71) Applicant: SailPoint Technologies, Inc., Wilmington, DE (US)

(72) Inventors: Jeffrey Allen Upton, Cedar park, TX (US); Vasil Shlapkou, Austin, TX (US)

(73) Assignee: SailPoint Technologies, Inc., Wilmington, DE (US)

( * ) Notice: Subject to any disclaimer, the term of this patent is extended or adjusted under 35 U.S.C. 154(b) by 0 days.

(21) Appl. No.: 17/014,343

(22) Filed: Sep. 8, 2020

(51) Int. Cl.
*G06F 15/16* (2006.01)
*H04L 67/51* (2022.01)
*H04L 67/1001* (2022.01)
*H04L 65/1073* (2022.01)
*H04L 67/146* (2022.01)

(52) U.S. Cl.
CPC .......... *H04L 67/16* (2013.01); *H04L 65/1073* (2013.01); *H04L 67/1002* (2013.01); *H04L 67/146* (2013.01)

(58) Field of Classification Search
CPC . H04L 67/16; H04L 65/1073; H04L 67/1002; H04L 67/146

USPC ......................................................... 709/203
See application file for complete search history.

(56) References Cited

U.S. PATENT DOCUMENTS

| | | | |
|---|---|---|---|
| 7,966,514 B2 * | 6/2011 | Surasinghe | G06F 11/2025 714/4.2 |
| 10,643,002 B1 * | 5/2020 | Veselov | G06Q 20/40145 |
| 10,706,155 B1 * | 7/2020 | Veselov | G06F 9/45558 |
| 2015/0007175 A1 * | 1/2015 | Potlapally | G06F 12/145 718/1 |
| 2015/0295844 A1 * | 10/2015 | Perreira | G06F 9/5072 709/226 |
| 2016/0269482 A1 * | 9/2016 | Jamjoom | H04L 43/0852 |
| 2016/0291992 A1 * | 10/2016 | Potlapally | G06F 12/145 |
| 2018/0324204 A1 * | 11/2018 | McClory | G06F 8/30 |
| 2019/0095241 A1 * | 3/2019 | Ago | G06F 16/2291 |
| 2019/0102411 A1 * | 4/2019 | Hung | H04L 41/0856 |
| 2019/0222988 A1 * | 7/2019 | Maes | H04L 41/5035 |

* cited by examiner

*Primary Examiner* — Alan S Chou
(74) *Attorney, Agent, or Firm* — Sprinkle IP Law Group

(57) ABSTRACT

Embodiments of a software services platform with a services infrastructure that allows standalone service to be run in association with other services deployed on a deployment platform. The service infrastructure and services may cooperate to ensure that that communications (associated with the standalone service are routed to that standalone service while communications for other services deployed in the software services may also continue communicating to receive and servicing requests for those services.

21 Claims, 13 Drawing Sheets

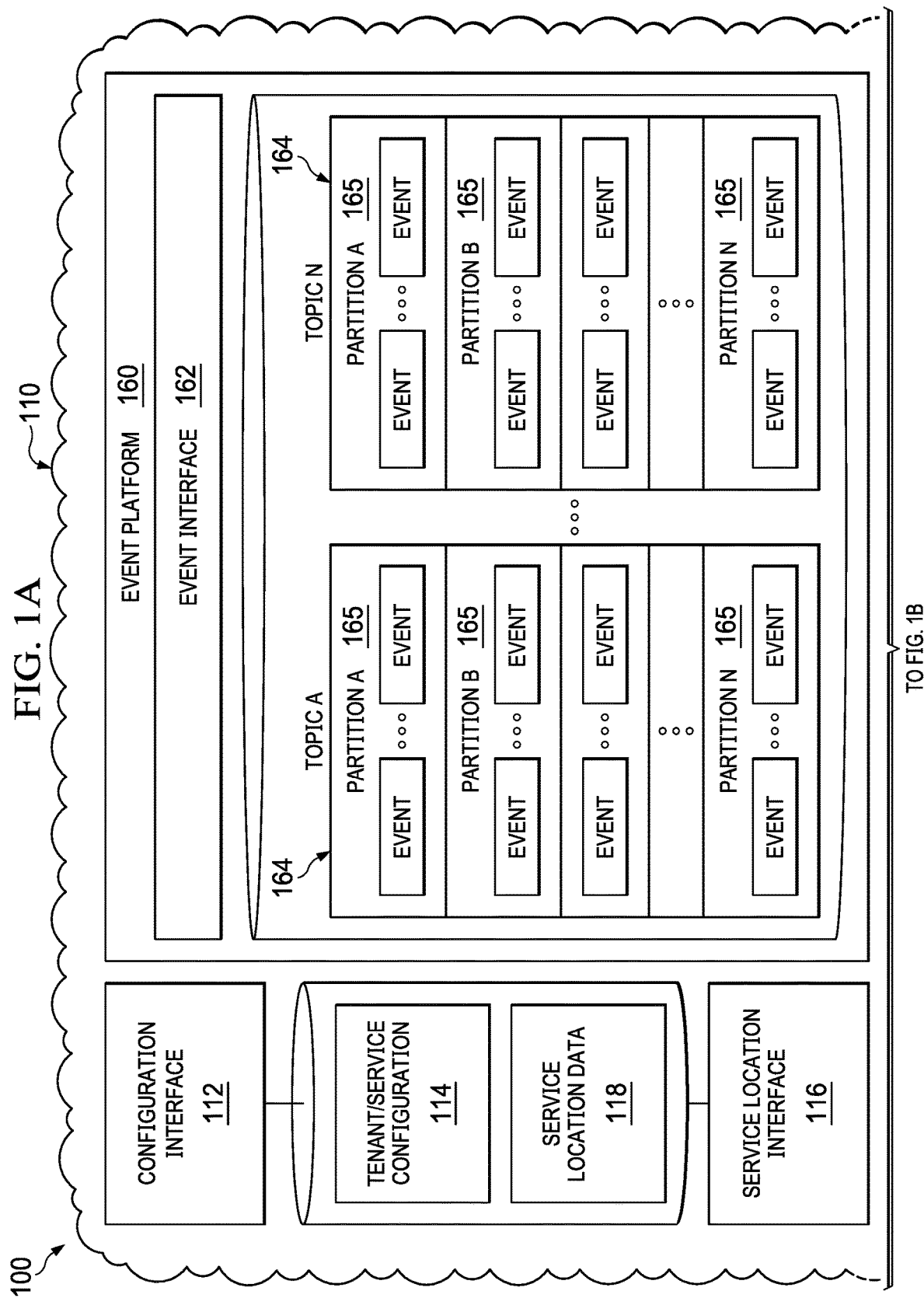

SYSTEM AND METHOD FOR SOFTWARE SERVICES PLATFORM ARCHITECTURE FOR SUPPORTING STANDALONE SERVICES OR DEVELOPMENT ENVIRONMENTS

TECHNICAL FIELD

This disclosure relates generally to distributed networked computer services platforms. In particular, this disclosure relates to distributed and networked computing environments providing Software as a Service (SaaS) platforms. Even more specifically, this disclosure relates to cloud based architectures for SaaS platforms that support standalone services or development environments.

BACKGROUND

An emerging information technology (IT) delivery model is a services model, by which shared resources, software or information are provided on-demand over a network to computers and other devices. Many times such services are provided in the context of cloud computing.

The use of cloud based services in this manner, while highly advantageous, is not without some problems. In many cases, it may be desired to run a standalone service in association with the other services that comprise a software platform. This situation often occurs, for example, when a developer is developing a service. The developer may be developing the service on his device, but in order to test or run the service under development as a standalone service the developer may need to interact with the other set of services of the software platform. However, for a variety of reasons, it may be difficult to have such a standalone service interact with the other deployed software services of the platform (e.g., deployed on the cloud computing platform).

What is desired therefore, are improved systems and methods for allowing standalone services to run in conjunction with deployed services of a software platform.

SUMMARY

Some additional context to particular embodiments may be useful. Many times the services of a software platform (e.g., sometimes referred to as web services) are provided in the context of cloud computing. A cloud computing based service generally refers to a service that allows requesters (e.g., clients such as other services or systems) to access operations provided by the service through one or more requests sent over a network (the Internet, for example) using an interface.

Many software providers have taken advantage of these new delivery models to implement their software solutions or applications (referred to as their software platform or solution) as a set of these services. Typically, the set of services providing the software platform are deployed in a cloud computing environment, as discussed. The use of cloud based services can be problematic in certain scenarios. In many cases, it may be desired to run a standalone service (e.g., a standalone instance of a service that it is desired to run outside the deployed set of services of the software platform) in association with the other services that comprise a software platform. This situation often occurs in the context of development of services of such a software platform (e.g., when creating a new service or making updates or fixes to an existing service). A user may be developing the service on his device, but in order to test or run the service under development as a standalone service the service may need to interact with the other set of services of the software platform.

However, for a variety of reasons, it may be difficult to have such a standalone service interact with the other software services of the platform deployed on the cloud computing platform. Some of these reasons have to do with that fact that the standalone service may have corresponding services in the set of services of the deployed software platform (e.g., services that are identical or that substantially duplicate the functionality and interfaces of the standalone service). Moreover, in many cases, each of the set of services deployed in the cloud may have many executing instances (e.g., duplicative processes executing the same service) in the set of deployed service. Not only that, but in many cases, the set of services deployed as the software platform may provide so-called "multitenant" support.

Usually, then, the communication or other infrastructures implemented in such software platforms to coordinate the operations of the set of services are implemented to allow the services to interoperate or communicate on what may be referred to as a non-deterministic basis, whereby any instance of a particular service may operate to service requests for that service (e.g., across tenants). In most cases, however, when running a standalone service it is often desirable to ensure that requests are routed or serviced in a particular manner for testing or other operational purposes, (e.g., to ensure that requests for the service implemented by the standalone service are routed to the standalone service, or responses to requests from the standalone service are routed back to the standalone service, etc.). Integrating a standalone service with such a services platform infrastructure in such a deterministic manner is extremely difficult.

What is desired therefore, are improved systems and methods for allowing standalone services to run in conjunction with deployed services of a software platform.

Accordingly, to ameliorate or address these issues, among other ends, embodiments of a software services platform that is adapted to allow the operation of instances of standalone services in association with the set of services of the services platform are disclosed. In particular, embodiments of a services platform as disclosed may provide a standalone mode of operation whereby an instance of a standalone service may integrate with the service infrastructure and the other services of the services platform, and communications to or from the standalone service may be handled by the services platform in at least a partially deterministic manner. Specifically, a multitenant services platform may provide a standalone mode for standalone services and a standalone aware mode for at least some of the other deployed services of the services platform. A standalone service may be associated with a specific tenant of the services platform. This tenant may, for example, be provisioned explicitly for a developer or other entity that desires to operate a standalone service.

The standalone service may operate in a standalone mode in a virtual private network (VPN) or virtual private cloud (VPC) with the services infrastructure and the set of deployed services of the service platform. The standalone service may be configured for operation substantially similarly to instances of the same service deployed on the deployment platform. The standalone service may also use a service registry interface provided by the services infrastructure to register with the service infrastructure by, for example, sending a registration request with registration information to the service registry interface. The registration information for the standalone service may include an identifier for the tenant associated with the standalone service and an identifier of the service (e.g., the type of the service or instance of the service or both). The registration information may also include location information. Such registration information may be stored in a registration entry in a service registry maintained by the service infrastructure. The service registry thus comprises entries for all standalone services (and their associated tenants) that are running in standalone mode at a particular time.

The service infrastructure of the services platform may then operate to ensure that the standalone service can run in association with the other standalone aware services deployed on the deployment platform, including where the deployed services include other instances of the same service that is under development. Specifically, the service infrastructure and standalone aware services may cooperate to ensure that that communications (e.g., requests or response) associated with the standalone service in standalone mode and the tenant associated with the standalone service are routed to that standalone service, while communications for the other services deployed in the services platform may continue communicating to receive and servicing requests for those services (and instances of deployed services that are of the same service as the standalone service continue receiving communications for that service for other tenants).

One mode of communication between services may be through the issuance of direct communications (e.g., requests or the like) from one service to a destination service (e.g., through an interface, such as a RESTful interface or the like, provided by the service being requested) using specific protocols such as Hypertext Transfer Protocol (HTTP). A response to that request can then be returned to the requesting service.

In one embodiment, then, the service location interface can determine if a requested service for an associated tenant is associated with a standalone service by accessing the service registry. Thus, the service registry and the location for a standalone service may be utilized to send communications directly to the standalone service instance=

In addition to such direct communications, however, there may be other modes by which services of a services platform communicate to through the services infrastructure. As an example, another method of communication between services of a software services platform may include messaging. In one embodiment, then, it is desired to ensure that messages for a standalone service for a tenant are routed to that standalone service, while allowing messages for the same service for other tenants or messages for other services are still routed to the appropriate service (e.g., a standalone service for that combination of service and tenant if it is running or an instance of the service on the deployment platform of the services platform). This configuration may be accomplished by having each instance of a service configure the messages queues it monitors based on the service registry having entries for standalone services, as discussed.

Another method of communication between services of a software services platform may include events. In some embodiments, then, in addition to a messaging platform and direct requests, a service infrastructure may also provide an event platform as yet another mode by which services of the service platform may communicate with one another. Standalone services may reserve partitions of event topics for their use. Thus, when a service is going to publish an event for a tenant in a topic the service may determine if any partitions for that topic are reserved for that tenant or if any other partitions are reserved for any other tenants for the topic and publish messages accordingly.

Specifically, in particular embodiments, a software services platform may comprise a services platform providing a set of multitenant services by executing a set of instances of each service and a services infrastructure for communicating between the set of instances of each of the set of services. The services infrastructure can comprise a service registry storing a registration entry for a standalone service instance of a first service for a first tenant executing on a platform distinct from the services platform, the registration entry including first location information associated with the distinct platform on which the standalone service instance is executing.

Service location data can comprise second location information for the first service, the second location information associated with the services platform. A service location interface can be adapted to receive a first request for a first location from an instance of a second service executing on the service platform, the first request identifying the first service and the first tenant and access the service registry to determine that the registration entry for the standalone service instance of the first service for the first tenant exists in the service registry. The service location interface can determine the first location associated with the standalone service instance of the first service for the first tenant based on the first location information in the registration entry for the standalone service instance of the first service for the first tenant in the service registry and return the first location of the standalone service instance of the first service on the platform distinct from the service platform in response to the request.

The service location interface can also receive a second request for a second location from the instance of the second service executing on the services platform, the second request identifying the first service and a second tenant, and access the service registry to determine that no registration entry corresponding to the first service for the second tenant exists in the service registry. The second location associated with second service for the second tenant can be determined based on the second location information in the service location data associated with the first service and the location of the standalone service instance of the first service on the platform distinct from the service platform returned in response to the request.

In some embodiments, the services platform is deployed on a cloud based computing platform.

In a particular embodiment, the first location information includes an IP address or port associated with the distinct platform of the standalone service instance.

In another embodiment, the standalone service instance is adapted to register with the services infrastructure when the standalone service instance is started and the registration entry is created in the service registry by the services infrastructure in response to the registration by the standalone service instance.

In some embodiments, the services infrastructure has a messaging platform, the messaging platform including a set of message queues for the first service, the set of message queues for the first service including a first message queue associated with the first tenant that is associated with the standalone service instance. Each instance of the first service on the services platform may be adapted to determine that the standalone service instance of the first service is associated with the first tenant based on the service registry, and obtain a first message for the first service associated with the second tenant from at least one of the set of message queues for the first service not including the first message queue associated with the first tenant. The standalone service instance may be adapted to only monitor the first message queue to obtain a second message for the first service associated with the first tenant from the first message queue.

In yet other embodiments, the services infrastructure comprises an event platform including a topic associated with the first service, wherein the topic is divided into a set of partitions, each partition including events for the topic for the first service, wherein the standalone service instance obtains events only from a first partition of the topic reserved by the standalone service instance. Each of the set of instances of each service can be adapted to determine that the first partition of the topic is reserved for the first tenant and to publish events for the topic and the first tenant to the first partition.

In certain embodiments, the services infrastructure includes a partition registry storing a partition reservation entry for the topic, the partition reservation entry for the topic comprising an identifier for the first partition associated with the first tenant.

Embodiments thus provide numerous advantages over previously available systems and methods for software services platforms. Some of these advantage relate to providing the ability of developers to only run the services that they are actively developing (typically one or two) locally on their machines, while the rest of the software services system can be run in a shared environment in the cloud. This shifts the developer resource cost from scaling with the number of services in total to the number of services being developed by a single developer. Moreover, the software services platform can stay in a valid state, even if the developer pauses a process in a debugger, or the process dies or stalls.

Thus, embodiments may achieve a drastic reduction in resource requirements for developer machines. Other advantages include significantly less developer environment maintenance (e.g., no images to download, no developer stack to maintain, etc.) and the fact that standalone services can continue to operate with a normally deployed infrastructure rather than local, mocked copies These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 1A and 1B are a block diagram of a distributed networked computer environment including a software services platform.

DETAILED DESCRIPTION

Figure 1B:
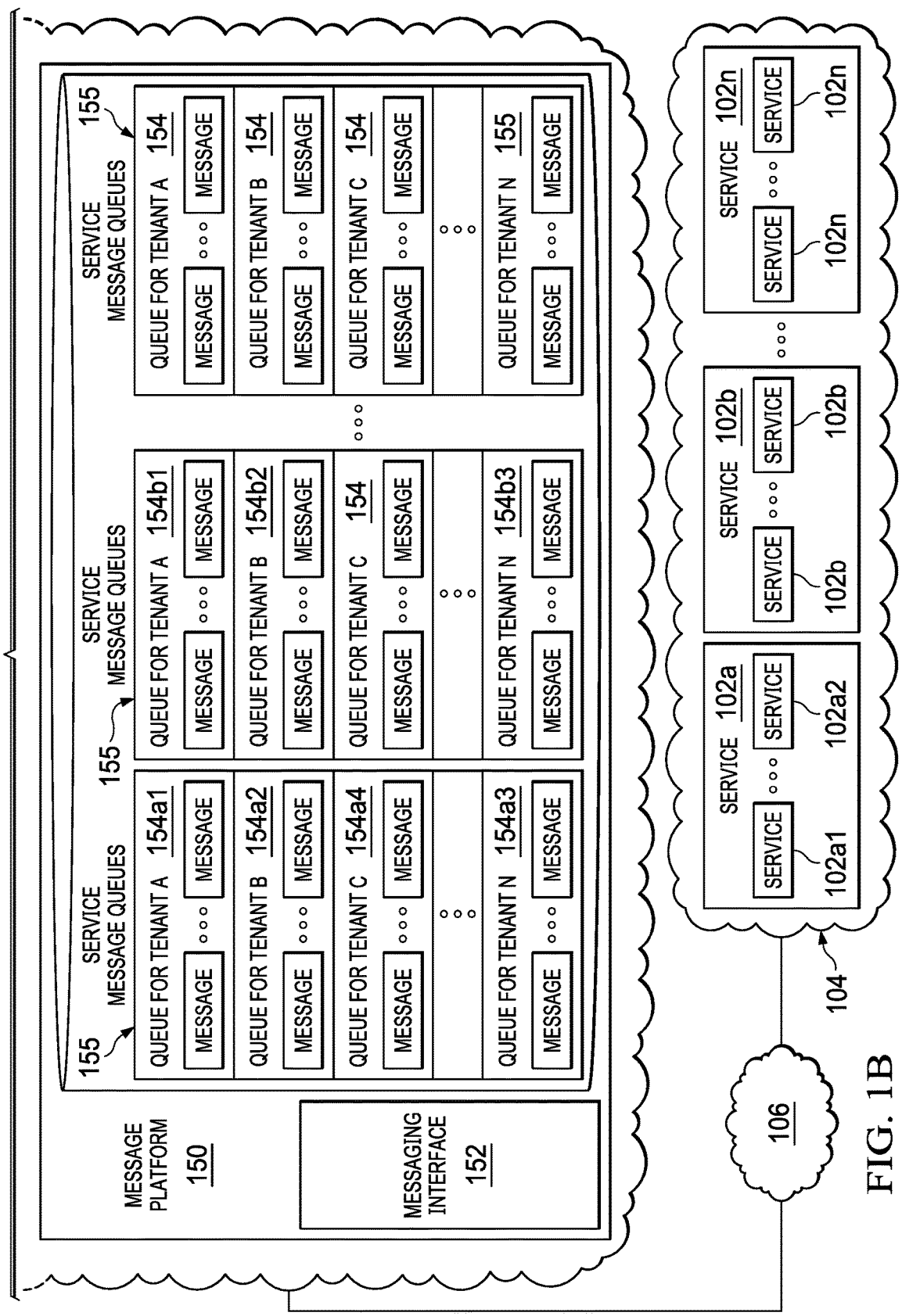

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. Many times the services of a software platform (e.g., sometimes referred to as web services) are provided in the context of cloud computing. A cloud computing based service generally refers to a service that allows requesters (e.g., clients such as other services or systems) to access operations provided by the service through one or more requests sent over a network (the Internet, for example) using an interface (e.g., a Representational State Transfer, or RESTful, interface or the like) provided by the service. In this manner, a service may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.). These services are generally referred to by the umbrella term SaaS.

Many software providers have taken advantage of these new delivery models to implement their software solutions or applications (referred to as their software platform or solution) as a set of these services. Typically, the set of services providing the software platform are deployed in a cloud computing environment, as discussed. Cloud computing resources are usually housed in large server farms that run these services, in many cases using a virtualized architecture wherein the service runs inside virtual servers, or so-called "virtual machines" (VMs) or "containers", that are mapped onto physical servers in a data center facility. Many providers of cloud computing platforms currently exist, such as Amazon Web Services (AWS), Google Cloud Platform, Microsoft Azure, etc. Thus, in many cases software providers, such as enterprises or the like, may deploy their software platform as a set of services on a third-party cloud computing platform such as AWS, alleviating the need for such enterprises to provide the hardware infrastructure for running such services.

The use of cloud based services can be problematic in certain scenarios. In many cases, it may be desired to run a standalone service (e.g., a standalone instance of a service that it is desired to run outside the deployed set of services of the software platform) in association with the other services that comprise a software platform. This situation often occurs in the context of development of services of such a software platform (e.g., when creating a new service or making updates or fixes to an existing service). A user may be developing the service on his device, but in order to test or run the service under development as a standalone service the service may need to interact with the other set of services of the software platform.

However, for a variety of reasons, it may be difficult to have such a standalone service interact with the other software services of the platform deployed on the cloud computing platform. Some of these reasons have to do with that fact that the standalone service may have corresponding services in the set of services of the deployed software platform (e.g., services that are identical or that substantially duplicate the functionality and interfaces of the standalone service). Moreover, in many cases, each of the set of services deployed in the cloud may have many executing instances (e.g., duplicative processes executing the same service) in the set of deployed service. Not only that, but in many cases, the set of services deployed as the software platform may provide so-called "multitenant" support (sometimes referred to as multitenant single deployment), whereby each of the set of services may handle requests associated with different tenants (e.g., entities, organizations, groups, or any collection or group of associated devices, software or users).

Usually, then, the communication or other infrastructures implemented in such software platforms to coordinate the operations of the set of services are implemented to allow the services to interoperate or communicate on what may be referred to as a non-deterministic basis, whereby any instance of a particular service may operate to service requests for that service (e.g., across tenants). In most cases, however, when running a standalone service it is often desirable to ensure that requests are routed or serviced in a particular manner for testing or other operational purposes, (e.g., to ensure that requests for the service implemented by the standalone service are routed to the standalone service, or responses to requests from the standalone service are routed back to the standalone service, etc.). Integrating a standalone service with such a services platform infrastructure in such a deterministic manner is extremely difficult.

Accordingly, integrating a standalone service with a deployed, cloud service based, software platform has heretofore been almost impossible. To run such a standalone service then, in most cases, users (e.g., developers) have run such standalone services on their devices, and have additionally downloaded images of all the other services of the software platform and run those services on the same device as well. Thus, the user requires a closed ecosystem of a full set of locally running services of the software platform to run the standalone service on the their device in a desired manner.

Each of these services, however, requires a base amount of processor and memory resources. This requirement is not a significant issue when the services are running on a (e.g., containerized) environment in the cloud, but it poses some problems on user machines. User machines are often limited to a certain amount of memory or processor cores. When the number of services surpassed twenty five or so, the resources required exceeded the available amount for typical user devices. This situation causes services to crash or run slowly which, in turn, usually causes users to disable services they deemed "unnecessary" for whatever tasks they are attempting to accomplish with the standalone service. The set of "necessary" services changes at a frequent enough cadence that this solution is impractical. While users may be given more powerful devices (e.g., with more cores or memory), such a solution is prohibitively expensive and of limited scalability. In addition, the maintenance of a local (e.g., containerized) environment is very slow, as container image sizes may be large and users may spend a good deal of time downloading the latest images each time an update to their local environment was needed (e.g., when any other service of the software platform is updated).

Moreover, certain trends with respect to software services exacerbate these problems. One trend is that increasingly services are being implemented as so-called microservices, whereby each of the services of the software platform may be implemented on a more granular scale. While this increased specialization has many advantages, one of the disadvantages for the scenario above is the increase in the number of services comprising the software platform (and thus increasing the resources needed to execute the services of such a software platform on a user's device).

What is desired therefore, are improved systems and methods for allowing standalone services to run in conjunction with deployed services of a software platform. Before delving into particular embodiments, it may now be useful to describe architectures for software services platforms and how communications are accomplished in such software services platforms.

Turning then to FIGS. 1A and 1B then, a software services platform 100 is depicted. The software services platform 100 may include a service platform comprising a set of services 102 (e.g., 102a, 102b, 102n) that may cooperate to implement particular functionality (e.g., solutions, applications, etc.) along with services infrastructure platform 110 that provides the communications and other infrastructure that allows the services 102 to interoperate or otherwise coordinate with one another to implement that functionality. Services 102 may be deployed on deployment platform 104 and may be deployed according to a microservices architecture. A microservices architecture is a service-oriented architecture where the services usually have a more fined-grained or the protocols used may be more lightweight.

The deployment platform 104 on which the services 102 are deployed may be, for example, a cloud computing platform or service (collectively cloud based computer services, cloud service providers or just cloud services or platform, all used herein interchangeably) such as AWS, Google Cloud Platform, Microsoft Azure, or the like, or a proprietary platform that includes a set of (virtual or physical) servers, that runs these services 102 and allow them to be accessed over network 106 (e.g., the Internet, an intranet, an internet, a Wide Area Network (WAN), a Local Area Network (LAN), a cellular network, a wireless or wired network, or another type of network).

Accordingly, requesters (e.g., clients such as other services or systems associated with third parties or services 102 of the set of services 102) may access operations provided by the services 102 through one or more requests sent over a network 106 using an interface (e.g., a Representational State Transfer (RESTful) interface or the like) provided by at least one of the services 102.

In many cases, the set of services 102 for the services platform may be multitenant services such that each of the set of services 102 may handle requests associated with different tenants (e.g., entities, organizations, groups, or any collection or group of associated devices, software or users). To facilitate the handling of a large number of these requests across multiple tenants, each service (e.g., 102a, 102b, 102n, etc.) may have multiple instances of that service 102 executing on the deployment platform 104 (e.g., service 102a may have executing instance 102a1, 102a2, etc.). Thus, a service (e.g., 102a) may be thought of as single logical service implemented by multiple executing instances (e.g., 102a1, 102a2, etc.) of that service (e.g., 102a). The multiple executing instances (e.g., 102a1, 102a2, etc.) are thus adapted to service the requests intended for the logical service (e.g., 102a). Services 102 of the service platform thus cooperate to perform the functionality of the software service platform 100.

Services infrastructure platform 110 may provide functionality to allow services 102 to be configured (e.g., for particular tenants, according to network addresses, etc.) and provide a communication infrastructure to allow service 102 to communicate with one another such as, for example, to issue requests to another service 102, to receive a response from another service 102 or to otherwise communicate between the services 102. Services 102 may, for example, be adapted to utilize the services infrastructure platform 110 through the inclusion of libraries associated with the interfaces of the services infrastructure platform 110. The services infrastructure platform 110 may itself be implemented as a set of services, applications or other functionality that is accessed through one or more interfaces that may include RESTful interfaces, Application Programming Interfaces (APIs) or other types of interfaces. Additionally, the services infrastructure platform 110 may also be deployed on a deployment platform, which may be the same as, or different, than a cloud computing platform 104 on which the set of services 102 of the service platform are deployed.

In particular, the service infrastructure platform 110 may include a configuration interface 112 for allowing services 102 to obtain configuration data for purposes of configuring themselves according to one or more configuration variables. Specifically, configuration data 114 may be maintained by the service infrastructure platform 110. This configuration data may include configuration data for each type of service 102 and, in some cases, include configuration data 114 defined on a per service, per tenant basis. Thus, a service 102 (e.g., an executing instance of a service 102) may send a request to the configuration interface 112 specifying the service 102 (e.g., the name or type of the service) and may, in some cases, also specify one or more tenants. Such a request can, for example, be sent at the time the service 102 is started.

The configuration interface 112 may access stored configuration data 114 defining configuration parameters for that service 102 based on the identified service or tenant. This configuration data 114 may be stored, for example, in DynamoDB tables or the like. These configuration parameters may include host names that may be used, signing keys, passwords, or other data that the service 102 may require for operation, or to access functionality of the service infrastructure platform 110. The service 102 can receive such configuration data from the configuration interface 112 and configure itself accordingly (e.g., by storing the received values for later use or by setting local or global variables to those values).

While executing then, an instance of a service 102 may need to issue requests or otherwise communicate or interact with other services 102 of the software platform. Services 102 may also need to obtain communications (or other interactions) intended for that service 102 from one or more other services 102 of the software services platform 100. Service infrastructure platform 110 may therefore provide one or more communication pathways or associated interfaces and infrastructure to facilitate communication or coordination between the services 102, to allow requests and responses to be issued and received by services 102 or to otherwise allow the services to interoperate or communicate.

For example, one mode of communication between services 102 may be through the issuance of direct communications (e.g., requests or the like) from one service 102 to a destination service 102 (e.g., through an interface, such as a RESTful interface or the like, provided by the service 102 being requested) using specific protocols such as Hypertext Transfer Protocol (HTTP). A response to that request can then be returned to the requesting service 102. To facilitate these direct communications the services infrastructure 110 may include a service location interface 116 through which services 102 may make requests for location data (e.g., routing information, IP addresses, ports, etc.) for desired services 102. The service location interface 116 may access the service location data 118 to determine a location for the desired service 102 and return this location to the service 102 which requested the location. The service 102 receives the location for the desired service and can then issue a request to this location. The determination of such a location for a service 102 may be done, for example, utilizing Domain Name System (DNS) lookups or the like.

Another method of communication between services 102 of the software services platform 100 may include messaging. To facilitate this messaging, services infrastructure 110 may include a messaging platform 150 which may be based on a messaging broker such as Reddis, RabbitMQ or the like. Messaging platform 150 may thus maintain sets 155 of message queues 154. Each set of queues 155 may be associated with a particular service 102, while each queue 154 within each set 155 of queues 154 may be associated with a particular tenant (e.g., entity). Thus, each service 102 may have one or more corresponding sets 155 of queues 154 where each of those queues 154 of the set 155 may be associated with a different tenant that can request various services or functionality from the software platform 100. In that manner, messages associated with servicing requests for a tenant (or otherwise performing tasks associated with requests from those tenants) may be separated into a message queue 154 specific to that tenant.

So, with reference to the depicted example, message queues 154a may be associated with service 102a. Each of these messages queues 154a for service 102a may be associated with a different tenant. Thus, for example, message queue 154a1 for service 102a may be associated with "Tenant A", message queue 154a2 for service 102a may be associated with "Tenant B", message queue 154a3 for service 102a associated with "Tenant N", etc. Likewise, message queue 154b1 for service 102b may be associated with "Tenant A", while message queue 154*b*2 for service 102*b* may be associated with "Tenant B", message queue 154*b*3 for service 102*b* may be associated with "Tenant N", etc. It will be noted here that while not depicted in FIG. 1, there may be multiple sets 155 of message queues, or message queues 154, associated with each service 102, where each of these message queues 154 may be associated with the same or a different set 155 of queues 154 or tenant.

Thus, when a service 102 wishes to send a message to another service 102 (e.g., to make a request to another service 102) the sending service 102 may send a message to that service 102 using message interface 152. Specifically, the service 102 sending the message may form the message associated with a particular tenant and service 102 and send a request to the messaging interface with the message and identifying the service and associated tenant. The messaging interface 152 can then place the message on the message queue 154 associated with the identified service and tenant. Again, if there are multiple sets 155 of queues 154 associated with a particular service 102, the set 155 of queues 154 on which to place the message for the service 102 may also be identified in the request to the messaging interface 152 from the sending service 152.

To continue with the above example, suppose a service 102*a* (e.g., executing instance of that service 102*a*1) wishes to send a message to service 102*b* where that message is associated with performing functionality for Tenant A. The service 102*a* (e.g., executing instance of that service 102*a*1) may send the message to the message interface 152 along with an identification of service 102*b* and that tenant (Tenant A). The messaging interface 152 can then place the received message on message queue 154*b*1 of the set 155*b* of message queues 154*b* corresponding to service 102*b* and Tenant A.

Thus, services 102 are configured to monitor queues 154 (e.g., associated with that service 102). Specifically, services 102 may be updated periodically with a configuration of which queues 154 to monitor such that when a message is available on one of the monitored queues 154 the service 102 may scan the queues it is configured to monitor using messaging interface 152 obtain the message from the monitored queue 154. The service 102*a* can then process any obtained messages (e.g., perform the service requested by the message). Specifically, each instance of a service 102 may scan queues 154 associated with that service 102 and all tenants to obtain the messages for that service 102 on the queues 154 being scanned to obtain messages associated with all tenants. So for example, instances 102*a*1, 102*a*2 of service 102*a* may each scan queues 154*a*1 for Tenant A, 154*a*2 for Tenant B, 154*a*4 for Tenant C, 154*a*3 for Tenant N, etc. using message interface 152 to obtain messages for that service 102*a* and process those messages.

In addition to messaging platform 150 and direct requests, service infrastructure may also provide an event platform 160 as yet another method services 102 of the service platform 100 may utilize to communicate with one another. Such an event platform 160 may be based on Apache's Kafka stream processing platform or the like. Here, events may be grouped by topic 164, where the events of each topic 164 may be subdivided into partitions 165. The number of partitions 165 for a given topic may be configurable. Events for different tenants that utilize service platform 100 may thus be co-located across the different partitions of a topic. In particular, in some cases each topic 164 may be associated with a pod comprising a group of tenants of the software services platform 100. Events for tenants of that pod may thus be co-located and intermingled across the partitions of that topic 164 for the pod.

Accordingly, services 102 may operate as publishers (producers) and consumers of events. When publishing an event for another service 102, a service 102 may determine the tenant with which the event is associated and publish the event to the topic 164 using the event interface 162 of the event platform 160. The event can then be placed on a partition 165 of that topic 164 by the event interface 162. Conversely, services 102 may subscribe to particular topics 164 using the event interface 162 of the event platform 160. The event platform 160 can then deliver events on the partitions 165 of topics 164 to those services 102 (e.g., services instances) subscribed to that topic. When a service 102 receives an event from the event platform 160 the service 102 can then process the event accordingly.

As can be seen then, a services infrastructure may provide a robust, efficient and fault tolerant method for services of a software platform to communicate with one another. Significantly, the use of the services infrastructure may facilitate the interoperation of multiple instances of cloud based services to cooperatively handle a large number of requests associated with the performing of services in a multitenant environment.

The use of such a services infrastructure and cloud based services can, however, be problematic in certain scenarios. In many cases, it may be desired to run a standalone service (e.g., a service that it is desired to run outside the deployed set of services of the software platform) in association with the (e.g., deployed) services that comprise a software platform. This situation often occurs in the context of development of services of such a software platform (e.g., when creating a new service or making updates or fixes to an existing service). For example, a user may be developing a service (e.g., on his own computing device), but in order to test or run the service under development as a standalone service the service may need to interact with the other set of services of the software platform. With an increasing number of services it becomes difficult, if not impossible, to run the entire set of services locally on a developer's computing devices. Accordingly, the developer may wish to execute a standalone service (e.g., the service under development) that interacts with the remainder of the services deployed on the deployment platform of the services infrastructure (e.g., in the cloud).

It may, however, be difficult to have such a standalone service interact with the other software services deployed on the deployment platform (e.g., the cloud platform). Some of these reasons have to do with that fact that the standalone service under development may have corresponding instances of that same service in the set of services of the deployed software platform (e.g., services that are identical or that substantially duplicate the functionality and interfaces of the standalone service under development), whereby each instance of a service may handle requests associated with different tenants (e.g., entities, organizations, groups, or any collection or group of associated devices, software or users).

As has been described then, the services infrastructure enables the communication and coordination of the operations of the set of services in a non-deterministic basis, whereby any instance of a particular service may operate to service requests for that service (e.g., across tenants). In most cases, however, when running a standalone service it is often desirable to ensure that requests are routed or serviced in a particular manner for testing or other operational purposes, (e.g., to ensure that requests for the service implemented by the standalone service are routed to the standalone service, or responses to requests from the standalone service are routed back to the standalone service, etc.). Achieving this mode of operation, however, may necessitate handling communications between services in a deterministic or partially deterministic manner. Achieving this type of communication is quite complex, especially given that there may be other instances of the same service still executing on the deployment platform of the service platform. Moreover, if the standalone service dies, stalls or fails, or is stopped for debugging or otherwise ceases to execute, the other services of the services platform, including other services having duplicative functionality of that standalone service must continue to function in a valid state. Integrating a standalone service with a software platform, and in particular a services infrastructure, in such a manner is extremely difficult.

To ameliorate or address these issues, among other ends, embodiments of a software services platform that is adapted to allow the operation of instances of standalone services in association with the set of services of the services platform are disclosed. In particular, embodiments of a services platform as disclosed may provide a standalone mode of operation whereby an instance of a standalone service (sometimes just referred to as a standalone service), such as a service under development or the like may integrate with the service infrastructure and the other services of the services platform, and communications to or from the standalone service may be handled by the services platform in at least a partially deterministic manner. Specifically, a multi-tenant services platform may provide a standalone mode for standalone services and a standalone aware mode for at least some of the other deployed services of the services platform. A standalone service may be associated with a specific tenant of the services platform. This tenant may, for example, be provisioned explicitly for a developer or other entity that desires to operate a standalone service.

The standalone service may operate in a standalone mode in a virtual private network (VPN) or virtual private cloud (VPC) with the services infrastructure and the set of deployed services of the service platform. Accordingly, when the standalone service is started it may first obtain a configuration for the service from the configuration interface of the service infrastructure for allowing services to obtain configuration data for purposes of configuring themselves according to one or more configuration variables (e.g., routing information, IP addresses, ports, etc.) for use in interacting with the services infrastructure and other service of the services platform. In this manner, the standalone service may be configured for operation substantially similarly to instances of the same service deployed on the deployment platform.

The standalone service may also use a service registry interface provided by the services infrastructure to register with the service infrastructure by, for example, sending a registration request with registration information to the service registry interface. The registration information for the standalone service may include an identifier for the tenant associated with the standalone service and an identifier of the service (e.g., the type of the service or instance of the service or both). The registration information may also include an IP address of a device where the standalone service may be running or otherwise associated with communicating with the standalone service, or one or more ports where communications (e.g., requests) to the standalone service may be routed or addressed. Such registration information may be stored in a registration entry in a service registry maintained by the service infrastructure.

The registration entry for the standalone service may also include a timestamp when the service was started, a timestamp of a last heartbeat message from the standalone service and a time for expiration (e.g., or time to live (TTL). The standalone service may send a heartbeat signal to the service registry interface (e.g., at regular intervals) when the standalone service is running. When the service registry interface receives such a heartbeat message the last heartbeat time associated with the entry in the registry for that standalone service may be updated. The service registry interface may periodically check the service registry and remove any entries in the service registry for standalone services where the time to live associated with that entry has expired such as where no heartbeat message has been received from that standalone service during a time interval specified by the time to live. Moreover, when the standalone service shuts down or is killed (e.g., or otherwise exits in a normal fashion), the standalone service may send a deregistration request to service registry interface which may remove the entry corresponding to the standalone service from the service registry when such a deregistration request is received. The service registry thus comprises entries for all standalone services (and their associated tenants) that are running in standalone mode at a particular time.

The service infrastructure of the services platform may then operate to ensure that the standalone service can run in association with the other standalone aware services deployed on the deployment platform, including where the deployed services include other instances of the same service that is under development. Specifically, the service infrastructure and standalone aware services may cooperate to ensure that that communications (e.g., requests or response) associated with the standalone service in standalone mode and the tenant associated with the standalone service are routed to that standalone service, while communications for the other services deployed in the services platform may continue communicating to receive and servicing requests for those services (and instances of deployed services that are of the same service as the standalone service continue receiving communications for that service for other tenants).

As discussed then, one mode of communication between services may be through the issuance of direct communications (e.g., requests or the like) from one service to a destination service (e.g., through an interface, such as a RESTful interface or the like, provided by the service being requested) using specific protocols such as Hypertext Transfer Protocol (HTTP). A response to that request can then be returned to the requesting service. To facilitate these direct communications the services infrastructure may include a service location interface through which services may make requests for location data (e.g., routing information, IP addresses, ports, etc.) for desired services. The service location interface may access the service location data to determine a location for the desired service and return this location to the service which requested the location. The service receives the location for the desired service and can then issue a request to this location. The determination of such a location for a service may be done, for example, utilizing Domain Name System (DNS) lookups or the like.

In one embodiment, then, the service location interface can determine if a requested service for an associated tenant is associated with a standalone service by accessing the service registry. Thus, when a service desires to send a request or other communication to another service, the requesting service may send a request for a location along with an identifier for the tenant to be associated with such a request (e.g., the tenant for which the services will be performing their services or whose data will be involved in the performing of such services). When the service location interface receives such a request for a service location for a service and tenant (e.g., a combination of service and tenant) the service location interface can access the service registry to determine if a registration entry associated with the requested service and tenant exists in the service registry. The presence of such a registration entry may indicate that an instance of the service for that tenant is operating in standalone mode. Thus, if a registration entry exists for that service and tenant combination in the service registry the service location interface can determine the route (e.g., IP address of the device on which the standalone service is executing, a port number, etc.) from the registration entry for that service and tenant combination. This location (e.g., route) for the requested service may be returned to the service that requested the location data. If a registration entry for the service and tenant does not exist (e.g., there is not a service for that tenant operating in standalone mode) the service location interface may access the service location data to determine a location for an instance of the desired service (e.g., on the deployment platform) and return this location to the service which requested the location.

Figure 2:
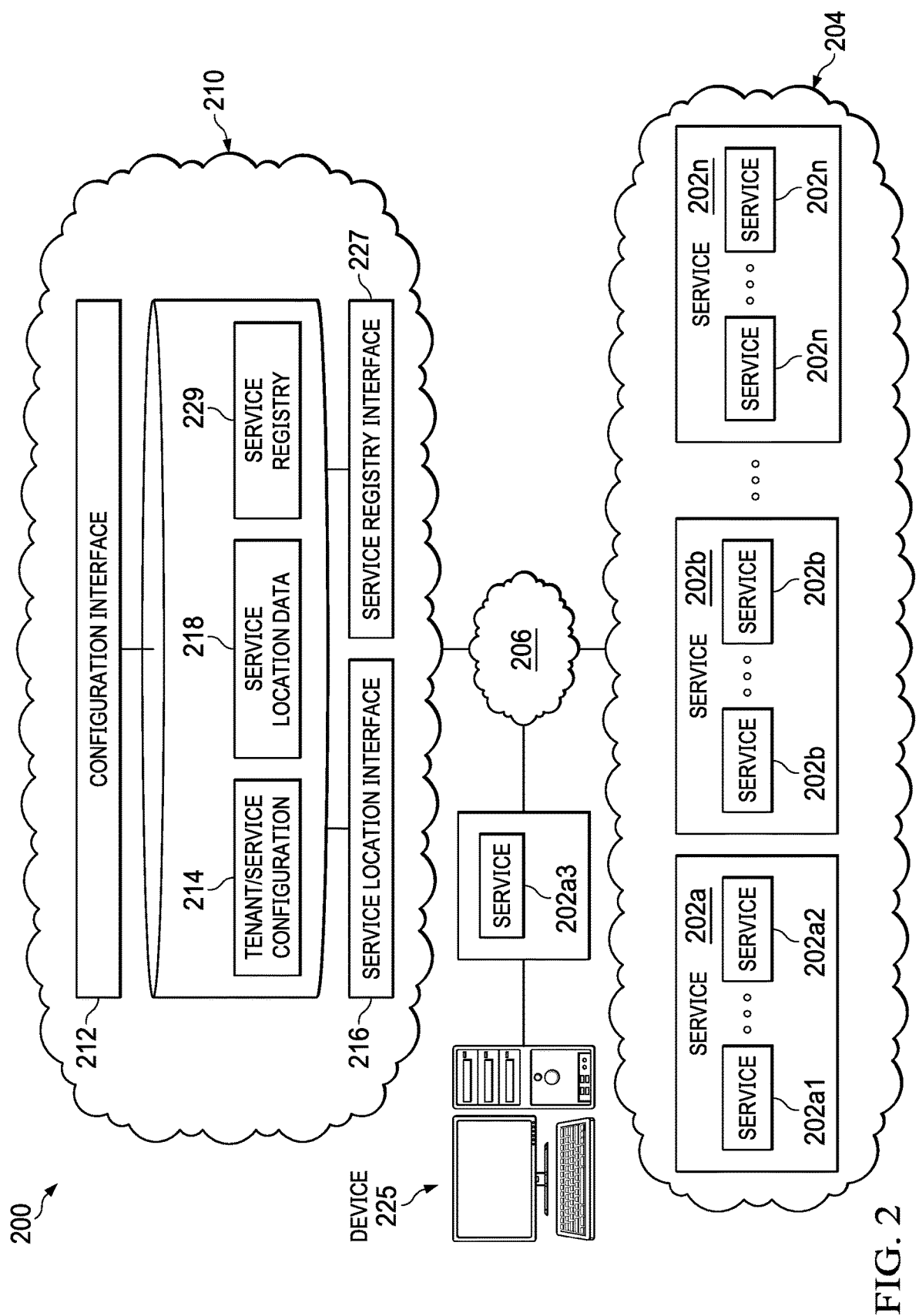
FIG. 2 is a block diagram of a distributed networked computer environment including one embodiment of a software services platform.

Such an embodiment is depicted in software service platform of FIG. 2. Here, the software services platform 200 may include a service platform comprising a set of services 202 (e.g., 202a, 202b, 202n) that may cooperate to implement particular functionality (e.g., solutions, applications, etc.) along with services infrastructure platform 210 that provides the communications and other infrastructure that allows the services 202 to interoperate or otherwise coordinate with one another to implement that functionality. Services 202 may be deployed on deployment platform 204, such as a cloud computing platform, and may be deployed according to a microservices architecture.

The set of services 202 for the services platform may be multitenant services such that each of the set of services 202 may handle requests associated with different tenants (e.g., entities, organizations, groups, or any collection or group of associated devices, software or users). To facilitate the handling of a large number of these requests across multiple tenants, each service (e.g., 202a, 202b, 202n, etc.) may have multiple instances of that service 202 executing on the deployment platform 204 (e.g., service 202a may have executing instance 202a1, 202a2, etc.). Thus, a service (e.g., 202a) may be thought of as single logical service implemented by multiple executing instances (e.g., 202a1, 202a2, etc.) of that service (e.g., 202a). The multiple executing instances (e.g., 202a1, 202a2, etc.) are thus adapted to service the requests intended for the logical service (e.g., 202a). Services 202 of the service platform thus cooperate to perform the functionality of the software service platform 200.

Accordingly, requesters (e.g., clients such as other services or systems associated with third parties or services 202 of the set of services 202) may access operations provided by the services 202 through one or more requests sent over a network 206 using an interface (e.g., a Representational State Transfer (RESTful) interface or the like) provided by at least one of the services 202.

Services infrastructure platform 210 may provide functionality to allow services 202 to be configured (e.g., for particular tenants, according to network addresses, etc.) and provide a communication infrastructure to allow service 202 to communicate with one another such as, for example, to issue requests to another service 202, to receive a response from another service 202 or to otherwise communicate between the services 202. Services 202 may, for example, be adapted to utilize the services infrastructure platform 210 through the inclusion of libraries associated with the interfaces of the services infrastructure platform 210. The services infrastructure platform 210 may itself be implemented as a set of services, applications or other functionality that is accessed through one or more interfaces that may include RESTful interfaces, Application Programming Interfaces (APIs) or other types of interfaces. Additionally, the services infrastructure platform 210 may also be deployed on a deployment platform, which may be the same as, or different, than a cloud computing platform 204 on which the set of services 202 of the service platform are deployed.

In particular, the service infrastructure platform 210 may include a configuration interface 212 for allowing services 202 to obtain configuration data for purposes of configuring themselves according to one or more configuration variables. Specifically, configuration data 214 may be maintained by the service infrastructure platform 210. This configuration data may include configuration data for each type of service 202 and, in some cases, include configuration data 214 defined on a per service, per tenant basis. Thus, a service 202 (e.g., an executing instance of a service 202) may send a request to the configuration interface 212 specifying the service 202 (e.g., the name or type of the service) and may, in some cases, also specify one or more tenants. Such a request can, for example, be sent at the time the service 202 is started.

In many cases, it may be desired to run a standalone service instance (e.g., an instance of a particular service that it is desired to run outside the deployed set of services of the software platform) in association with the (e.g., deployed) services that comprise a software platform. This situation often occurs in the context of development of services of such a software platform (e.g., when creating a new service or making updates or fixes to an existing service). For example, a user may be developing a service (e.g., on his own computing device), but in order to test or run the service under development as a standalone service the service may need to interact with the other set of services of the software platform. In certain instances, in fact, the standalone service instance 202a3 may have other instances of the same service 202a1, 202a2, etc. deployed in the cloud computing platform 204. A tenant may thus be assigned to the developer or other user such that any standalone services associated with that developer or other user may likewise be associated with same tenant. Such a tenant may be distinct from other tenants whose requests are serviced by the service platform 200.

In an embodiment, then, a standalone service 202a3 may be deployed on a device 225. This device 225 may, for example, be the computing device of a developer or almost any other user who wishes to run such a standalone service 202a3. A standalone service 202a3 may be an instance of a service 202a running in a standalone mode. Running in standalone mode may refer to the fact that the standalone service 202a3 is running remotely from the deployment platform 204 on which the other services 202 are running without any other indicators, or may be a flag or other indicator or variable stored locally (e.g., to the standalone service 202a3) or globally within the services infrastructure 210 or platform 200 that indicates the standalone service 202a3 is operating as a standalone service. Thus, the standalone service 202a3 may be associated with the tenant associated with the developer or other user who is running (e.g., developing) that standalone service 202a3. The standalone service may operate in a standalone mode in a virtual private network (VPN) or virtual private cloud (VPC) with the services infrastructure 210 and the set of deployed services 202 of the service platform. The standalone service 202a3 and the user device 225 thus have access to the resources of the software services platform and the services 202 and services infrastructure platform 210 may have access to the standalone service 202a3 or device 225.

Accordingly, when the standalone service 202a3 is started it may first obtain a configuration for that (e.g., type of) service 202a3 from the configuration interface 212 of the service infrastructure 210 for allowing services to obtain configuration data for purposes of configuring themselves according to one or more configuration variables (e.g., routing information, IP addresses, ports, etc.) for interacting with the services infrastructure and other service of the services platform. In this manner, the standalone service 202a3 may be configured for operation substantially similarly to instances 202a1, 202a2 of the same service deployed on the deployment platform.

The standalone service 202a3 may also use a service registry interface 227 provided by the services infrastructure 210 to register with the service infrastructure 210 by, for example, sending a registration request with registration information to the service registry interface 227. The registration information for the standalone service 202a3 may include an identifier for the tenant associated with the standalone service 202a3 and an identifier of the service 202a3 (e.g., the type of the service 202a or instance of the service 202a3 or both). The registration information may also include an IP address or host name of device 225 where the standalone service 202a3 may be running or otherwise associated with communicating with the standalone service 202a3, or one or more ports where communications (e.g., requests) to the standalone service 202a3 may be routed or addressed. Such registration information may be stored in a registration entry in a service registry 229 maintained by the service infrastructure 210. An example of such a service registry is depicted below:

service registry interface 227 receives such a heartbeat message the last heartbeat time associated with the entry in the registry 229 for that standalone service 202a3 may be updated. The service registry interface 227 may periodically check the service registry and remove any entries in the service registry 227 for standalone services where the time to live associated with that entry has expired, such as where no heartbeat message has been received from that standalone service 202a3 during a time interval specified by the time to live. Moreover, when the standalone service 202a3 shuts down or is killed (e.g., or otherwise exits in a normal fashion), the standalone service 202a3 may send a deregistration request to service registry interface 227 which may remove the entry corresponding to the standalone service 202a3 from the service registry 227 when such a deregistration request is received. The service registry 227 thus comprises entries for all standalone services (and their associated tenants) that are running in standalone mode at a particular time.

While executing then, an instance of a service 202 (including standalone service 202a3) may need to issue requests or otherwise communicate or interact with other services 202 of the software platform. Services 202 may also need to obtain communications (or other interactions) intended for that service 202 from one or more other services 202 of the software services platform 200. Service infrastructure platform 210 may therefore provide one or more communication pathways or associated interfaces and infrastructure to facilitate communication or coordination between the services 202, to allow requests and responses to be issued and received by services 202 or to otherwise allow the services to interoperate or communicate.

As discussed, one mode of communication between services 202 may be through the issuance of direct communications (e.g., requests or the like) from one service 202 to a destination service 202 (e.g., through an interface, such as a RESTful interface or the like, provided by the service 202 being requested) using specific protocols. A response to that request can then be returned to the requesting service 202. To facilitate these direct communications the services infrastructure 210 may include a service location interface 216

| id (S) | connection (S) | created (S) | expiration (N) | hostname (S) | service_id (S) | tenant_id (S) |
|---|---|---|---|---|---|---|
| 17057fc84d764ea8bd5702d57fd38988 | 10.255.0.93:3448 | 2020-06-23T13:11:34.338-05:00 | 1592951735 | nmougin-12812 | wgms | mougin-fero |
| 2c3b268629a6411d860c9f66b749b768 | 10.255.0.93:3295 | 2020-06-23T17:18:45.478-05:00 | 1592951385 | vschapkou-11762.local | cloud-debug | vasil-test-pod |
| 6d56be5b331d44bcbd7a616bfcb580c0 | 10.255.0.93:3086 | 2020-06-23T17:06:02.181-05:00 | 1592951762 | brose-11550 | rosetta | fastfed |
| 8dcd55c0c5e94051a8cb58f9f3f1d02c | 10.255.0.93:3416 | 2020-06-23T15:06:03.542-05:00 | 1592951764 | dlara-12557 | ets | domingo-mega-org |
| 8ff737c232d54fcfa99479f5655b4f06 | 10.255.0.93:3094 | 2020-06-23T17:18:56.737-05:00 | 1592950977 | currutia-MBPR.local | taco | carlosdev01 |
| d06c06d7622b46f6838e36a8ca702ed1 | 10.255.0.93:3094 | 2020-06-23T17:21:20.851-05:00 | 1592951721 | currutia-MBPR.local | taco | carlosdev01 |
| e3eb6bd1563c4ac38b47f2fffa7e0c941 | 10.255.0.93:3365 | 2020-06-23T17:23:17.385-05:00 | 1592951717 | mamruthal-12690 | rats | mahesh |
| f64d6b27e2634c5d9853a62c67a5736e | 10.255.0.93:3546 | 2020-06-23T17:25:19.915-05:00 | 1592951720 | rpapisetti-12824.local | sweep | ravi-papisetti-3 |

The registration entry for the standalone service 202a3 may also include a timestamp when the service was started, a timestamp of a last heartbeat message from the standalone service and a time for expiration (e.g., or time to live (TTL). The standalone service 202a3 may send a heartbeat signal to the service registry interface 227 (e.g., at regular intervals) when the standalone service 202a3 is running. When the through which services 202 may make requests for location data (e.g., routing information, IP addresses, ports, etc.) for desired services 202. Such a request for location may include a tenant identifier identifying a tenant (e.g., a tenant for whom the request to the located service will be associated). The service location interface 216 may access the service location data 218 to determine a location for the desired service 202 and return this location to the service 202 which requested the location. The service 202 receives the location for the desired service and can then issue a request to this location.

As may be understood from the discussion herein, it is desirable that requests for service 202*a* associated with the tenant of standalone service 202*a*3 should be routed to standalone service 202*a*3 while requests for service 202*a* associated with other tenants should be routed accordingly (e.g., to other instances of the service 202*a* deployed on deployment platform 204 or to other standalone services (not shown) associated with that tenant).

In one embodiment, then, the service location interface 216 can determine if a requested service location for an associated tenant is associated with standalone service 202*a*3 by accessing the service registry 229. Thus, when a service 202 desires to send a request or other communication to another service 202, the requesting service 202 may send a request for a service location along with an identifier for the tenant to be associated with such a request (e.g., the tenant for which the services will be performing their services or whose data will be involved in the performing of such services) to the service location interface 216. When the service location interface 216 receives such a request for a service location for a service 202 and tenant (e.g., a combination of service and tenant) the service location interface 216 can access the service registry 229 to determine if a registration entry associated with the requested service 202 and tenant exists in the service registry 229.

The presence of such a registration entry in the service registry 229 may indicate that an instance of the service 202*a*3 for that tenant is operating in standalone mode. Thus, if a registration entry exists for that service 202 and tenant combination in the service registry 229, the service location interface 216 can determine the route (e.g., IP address of the device on which the standalone service is executing, a port number, etc.) from the registration entry for that service 202*a*3 and tenant combination. Here, for example, the location may include an IP address of the device 225 on which the standalone service 202*a*3 is executing and one or more associated ports. This location (e.g., route) for the requested service 202*a*3 may be returned to the service 202 that requested the location data by the service location interface 216. If, however, a registration entry for the service and tenant does not exist in the service registry 229 (e.g., there is not a service for that tenant operating in standalone mode) the service location interface 216 may access the service location data 218 to determine a location for an instance of the desired service (e.g., on the deployment platform) and return this location to the service 202 which requested the location.

Figure 3A:
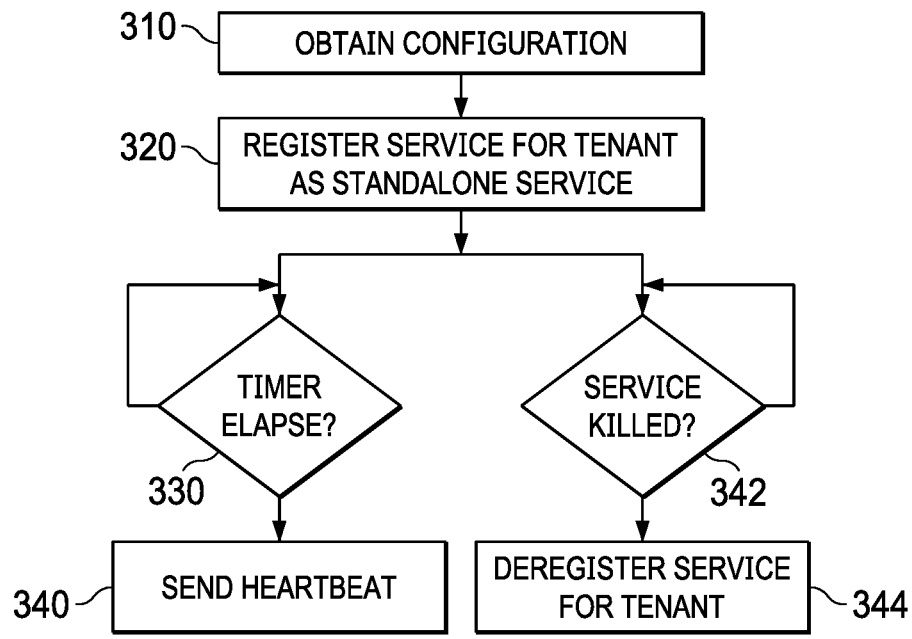
FIGS. 3A and 3B are flow diagrams of embodiments of a method for communication that may be employed by a software services platform.
Figure 3B:
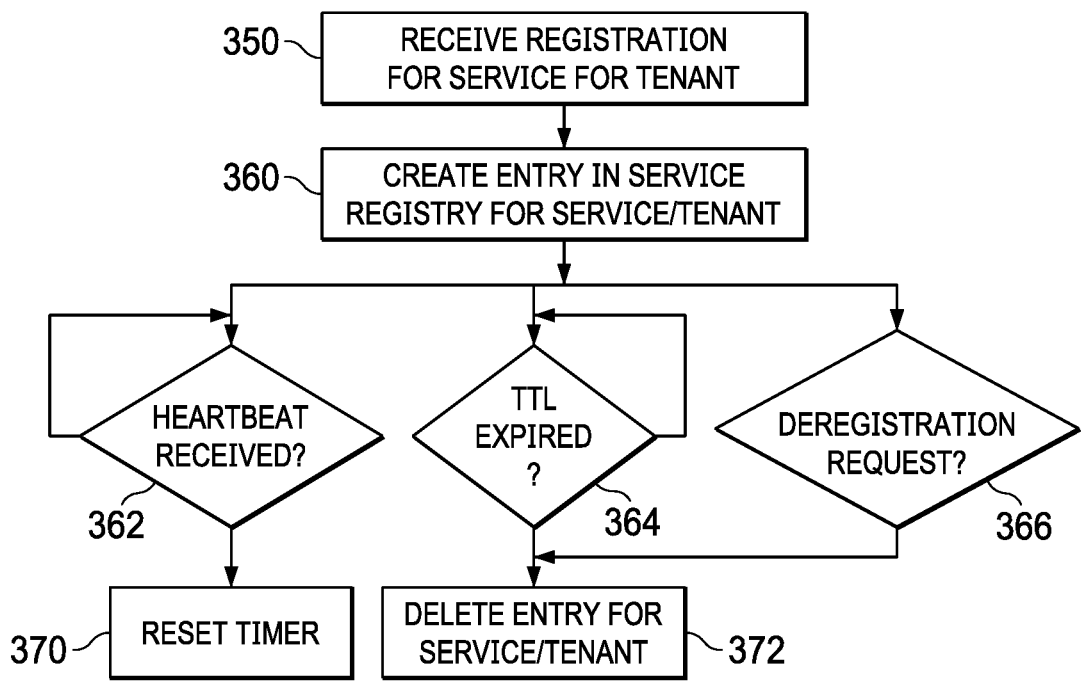

Moving now to FIGS. 3A and 3B, embodiments of methods for registering a standalone service with a services infrastructure are depicted. Referring first to FIG. 3A, one embodiment of a method that may be performed by a standalone service for registering with a services infrastructure platform is depicted. Initially, when a standalone service is started (e.g., or restarted, etc.) or otherwise begins executing, the standalone service may obtain a configuration for that (e.g., type of) service from the service infrastructure (STEP 310). This configuration may include configuration data for purposes of configuring the standalone service according to one or more configuration variables (e.g., routing information, IP addresses, ports, etc.) for interacting with the services infrastructure and other service of the services platform.

The standalone service can the register with the services infrastructure (STEP 320). This registration may include sending a registration request with registration information to the services infrastructure. The registration information for the standalone service may include an identifier for the tenant associated with the standalone service and an identifier of the standalone service. The registration information may also include an IP address or host name of the device where the standalone service may be running or otherwise associated with communicating with the standalone service, or one or more ports where communications (e.g., requests) to the standalone service may be routed or addressed. The standalone service may send a heartbeat signal (STEP 340) to the service registry interface (e.g., at the expiration of a timer) (STEP 330) when the standalone service is running. Moreover, when the standalone service shuts down or is killed (e.g., or otherwise exits in a normal fashion) (STEP 342), the standalone service may send a deregistration request to service registry interface (STEP 344).

In FIG. 3B, one embodiment of a method that may be performed by a services infrastructure platform to register a standalone service is depicted. Here, a registration request with registration information may be received from a standalone service at the services infrastructure (STEP 350). This registration information may include an identifier of the service (such as a name for the service) and an identification of a tenant associated with the service. The registration information may also include an IP address or host name of device where the standalone service may be running or otherwise associated with communicating with the standalone service, or one or more ports where communications (e.g., requests) to the standalone service 202*a*3 may be routed or addressed. When this registration request is received, the services infrastructure may create a registration entry including the registration information for that standalone service in a service registry maintained by the service infrastructure (STEP 360). The registration entry for the standalone service 202*a*3 may also include a timestamp when the standalone service was started, a timestamp of a last heartbeat message from the standalone service or a time for expiration (e.g., or time to live (TTL)).

The service infrastructure can then determine if a new heartbeat message has been received from that standalone service (STEP 362). When a new heartbeat message is received for that service and tenant the registration entry for that service and tenant may be update with a new TTL (or the time at which the most recent heartbeat message was received (STEP 370). Likewise, the service infrastructure can determine if a TTL associated with registration entry has expired (e.g., a certain amount of time since the last heartbeat was received has expired) (STEP 364). If it has determined that a TTL has expired, the registration entry for that service and tenant may be removed from the service registry (STEP 372). Similarly, if at some point a deregistration request is received from that service associated with the tenant (STEP 366) the registration entry may be removed from the service registry (STEP 372).

Figure 4A:
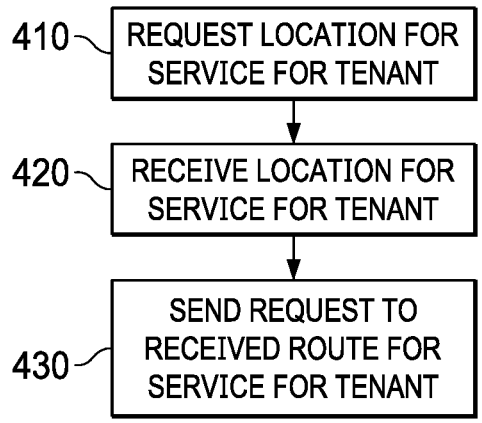
FIGS. 4A and 4B are flow diagrams of embodiments of a method for communication that may be employed by a software services platform.
Figure 4B:
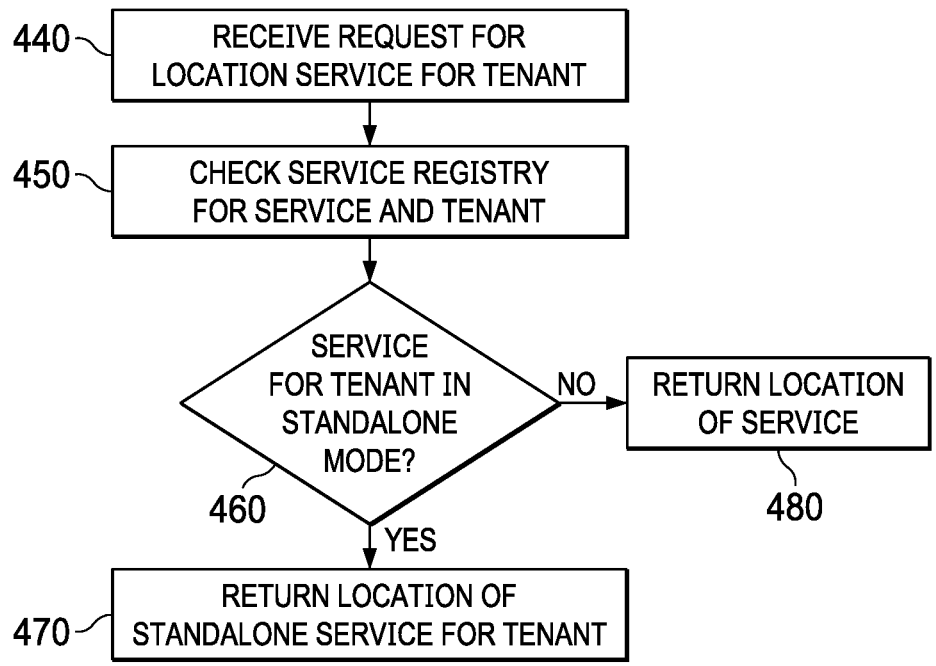

FIGS. 4A and 4B depict embodiments of methods for utilizing this service registry of a services infrastructure to facilitate direct communications between services (including standalone services) of a services platform. Specifically, FIG. 4A depicts one embodiment of a method for a service to request a location for another service to which it is desired to send a request or other communication. The service that will be sending the communication may send a request for location data (e.g., routing information, IP addresses, ports, etc.) for a desired service to the service infrastructure (STEP

410). This request for the location for the service may include an identifier of a tenant associated with such a request (e.g., the tenant for which the services will be performing their services or whose data will be involved in the performing of such services). The service that will be sending the communication can receive the location (e.g., the IP address, port, hostname, etc.) from the service infrastructure (STEP 420) and send the request to the desired service at the received location (STEP 430).

FIG. 4B depicts an embodiment of a method for a service infrastructure for handling a request for the location of a service. When the service infrastructure receives such a request for a service location for a service and tenant (e.g., a combination of service and tenant) (STEP 440) the service infrastructure can access the service registry to determine if a registration entry associated with the requested service and tenant exists in the service registry (STEP 450). The presence of such a registration entry in the service registry may indicate that an instance of that service for that tenant is operating in standalone mode.

Thus, if there is a registry entry for the requested service and tenant (Y branch of STEP 460) in the service infrastructure can determine the location of the requested service for that tenant the (e.g., IP address of the device on which the standalone service is executing, a port number, etc.) from the registration entry for that service and tenant combination. This location (e.g., route) for the requested service and tenant may be returned to the service that requested the location data by the service infrastructure (STEP 470). If, however, a registration entry for the service and tenant does not exist in the service registry (e.g., there is not a service for that tenant operating in standalone mode) (N branch of STEP 460) the service infrastructure may access service location data to determine a location for an instance of the desired service (e.g., on the deployment platform) and return this location to the service which requested the location (STEP 480). The service that requested this location can thus receive the location for the desired service and can then issue a request to this location. In this manner, requests or other communications for the standalone service and the associated tenant may be sent directly to that standalone service the device on which the standalone service is executing while requests for that server for other tenants or other services may still be sent to instances of services on the deployment platform (or, in cases where other standalone services (e.g., for the same or other tenants) may be executing to the location of those standalone services).

In addition to such direct communications, however, there may be other modes by which services of a services platform communicate to through the services infrastructure. It is likewise desirable that the service infrastructure of a services platform adapt these other modes of communication such that these other modes of communication may still be utilized by the services of the platform while still ensuring that the standalone service can run in association with the other standalone aware services deployed on the deployment platform, including where the deployed services include other instances of the same service that is under development.

Again it is desirable that the service infrastructure and standalone aware services may cooperate to ensure that that communications (e.g., requests or response) associated with the standalone service in standalone mode and the tenant associated with the standalone service are routed to that standalone service, while communications for the other services deployed in the services platform may continue communicating to receive and servicing requests for those services (and instances of deployed services that are of the same service as the standalone service continue receiving communications for that service for other tenants).

As previously referred to, another method of communication between services of a software services platform may include messaging. In some embodiments, then a set of queues may be associated with a particular (e.g., type of) service, where each queue within each set of queues may be associated with a particular tenant. Thus, each service of the services platform may have one or more corresponding sets of queues where each of those queues of the set may be associated with a different tenant that can request various services or functionality from the software platform. In that manner, messages associated with servicing requests for a tenant (or otherwise performing tasks associated with requests from those tenants) may be separated into a message queue specific to that tenant.

Thus, when a service wishes to send a message to another service (e.g., to make a request to another service) the sending service may send a message to that service using a message interface of the service infrastructure. Specifically, the service sending the message may form the message associated with a particular tenant and service and send a request to the messaging interface with the message and identifying the service and associated tenant. The message can then be placed on the message queue associated with the identified service and tenant. The services of the services platform are configured to monitor queues associated with their (e.g., type of) service. The services of the services infrastructure may scan the queues it is configured to obtain messages from the monitored queue. A service can then process any obtained messages (e.g., perform the service requested by the message). Specifically, each instance of a service may scan queues associated with that service and (e.g., all or a subset of) tenants to obtain the messages for that service on the queues being scanned and process any obtained messages.

In one embodiment, then, it is desired to ensure that messages for a standalone service for a tenant are routed to that standalone service, while allowing messages for the same service for other tenants or messages for other services are still routed to the appropriate service (e.g., a standalone service for that combination of service and tenant if it is running or an instance of the service on the deployment platform of the services platform). This configuration may be accomplished by having each instance of a service configure the messages queues it monitors based on the service registry having entries for standalone services, as discussed.

Specifically, according to one embodiment, at some interval (e.g., a time interval) each instance of an executing service operating in standalone aware mode (e.g., the instances of services deployed on the deployment platform of the software services platform) may scan queues associated with its type of service (e.g., the type of service of that service instance) to determine if there are any messages for processing. Each time the scan of monitored queues is preformed the instance of the service may access the service registry to determine if there any instances of the same type of service in standalone mode (e.g., if there are any registry entries in the service registry for the same type of service). If there are any instances of the same type of service in standalone mode, the tenants associated with those instances of standalone services of the same type may be obtained from the service registry entries associated with those standalone services. The instance of the service can then scan the message queues for that service that are not associated with those tenants and process any messages obtained from those monitored queues.

Similarly, a standalone service operating in standalone mode may be configured with the tenant associated with that service (e.g., the tenant associated with the developer on whose device the standalone service is executing). Thus, a standalone service operating in standalone mode may be configured to scan message queues associated with its type of service (e.g., the type of service of that standalone service) associated with that tenant. In this manner, all messages for that type of service associated with that tenant may be obtained by the standalone service while messages for that service for other tenants may be obtained and processed by the instances of that type of service deployed on the deployment platform or, in cases where other instances of standalone services for that type of service are running for other tenants, messages for that services and those tenants may be obtained by the respective standalone services for those tenants.

Figure 5A:
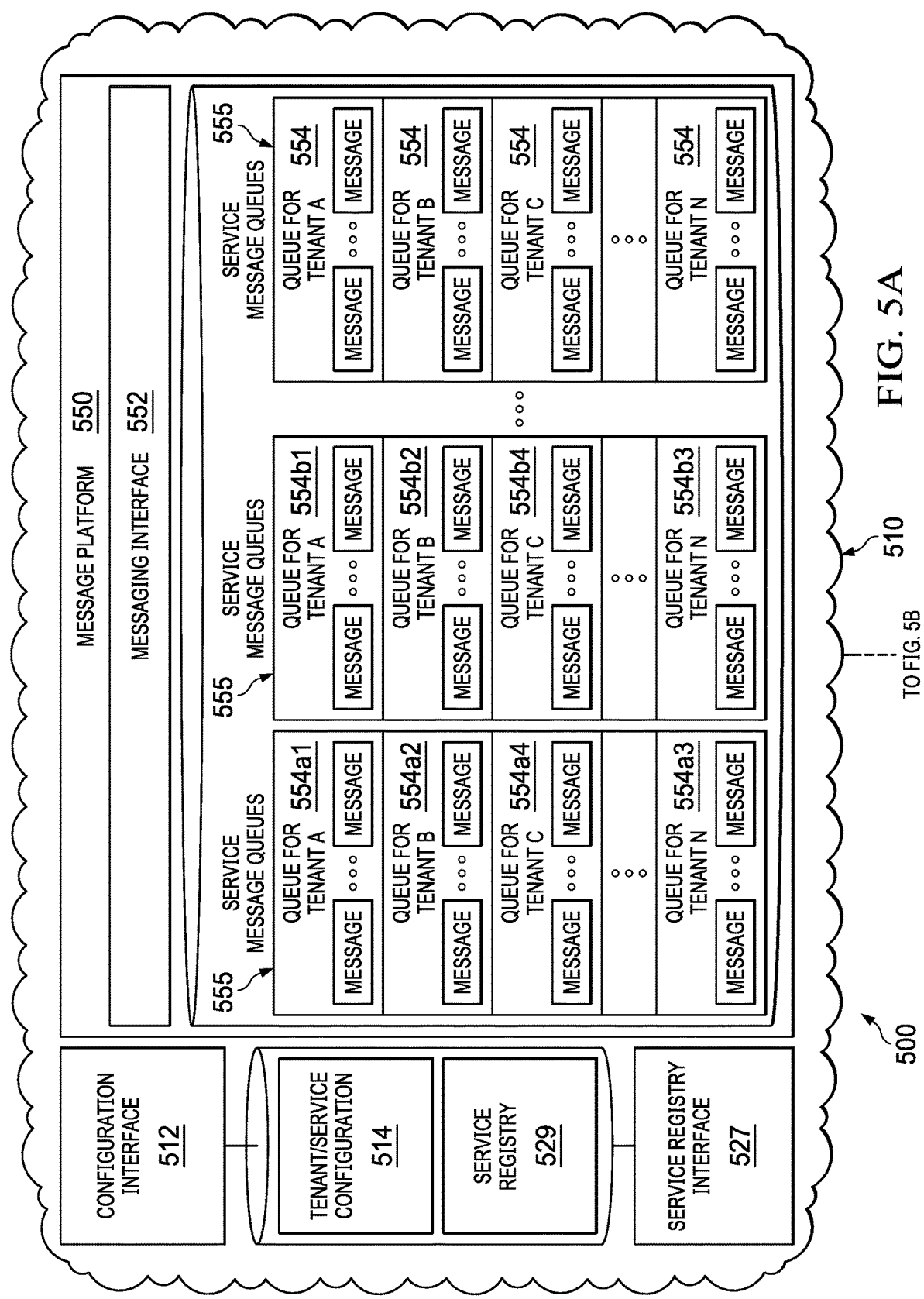
FIGS. 5A and 5B are a block diagram of a distributed networked computer environment including one embodiment of a software services platform.
Figure 5B:
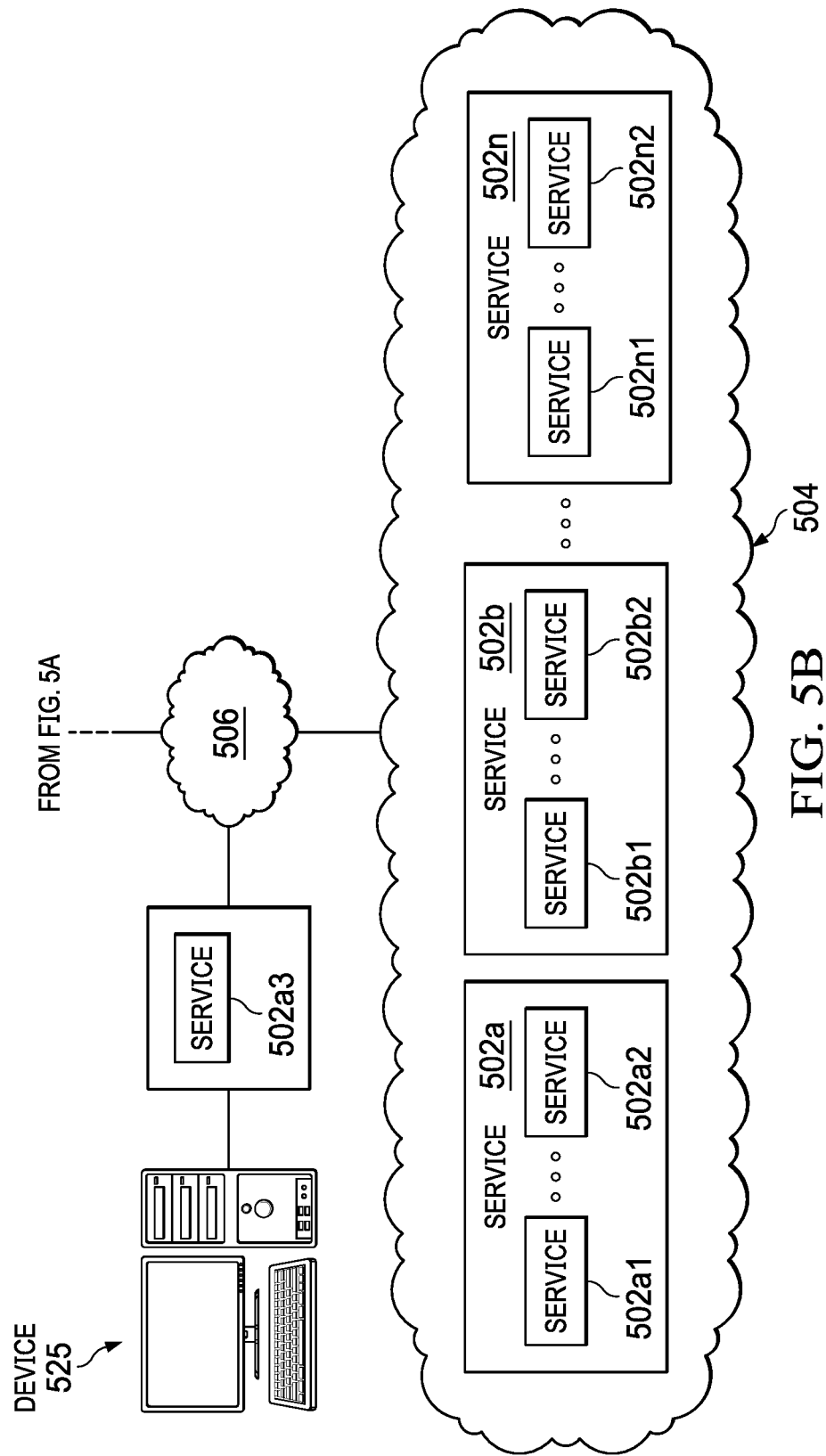

Such an embodiment is depicted in software service platform of FIGS. 5A and 5B. Again, the software services platform 500 may include a service platform comprising a set of services 502 (e.g., 502a, 502b, 502n) that may cooperate to implement particular functionality (e.g., solutions, applications, etc.) along with services infrastructure platform 510 that provides the communications and other infrastructure that allows the services 502 to interoperate or otherwise coordinate with one another to implement that functionality. Services 502 may be deployed on deployment platform, such as a cloud computing platform, and may be deployed according to a microservices architecture. Certain aspects of the software services platform 500 may be similar to those described with respect to other embodiments of software services platform described herein as will be understood.

The set of services 502 for the services platform may be multitenant services such that each of the set of services 502 may handle requests associated with different tenants (e.g., entities, organizations, groups, or any collection or group of associated devices, software or users). To facilitate the handling of a large number of these requests across multiple tenants, each service (e.g., 502a, 502b, 502n, etc.) may have multiple instances of that (e.g., type of) service 502 executing on the deployment platform 504 (e.g., service 502a of a first type may have executing instance 502a1, 502a2, etc.). Thus, a service (e.g., 502a) may be thought of as single logical service implemented by multiple executing instances (e.g., 502a1, 502a2, etc.) of that service (e.g., 502a). The multiple executing instances (e.g., 502a1, 502a2, etc.) are thus adapted to service the requests intended for the logical service (e.g., 502a). Services 502 of the service platform thus cooperate to perform the functionality of the software service platform 500.

Accordingly, requesters (e.g., clients such as other services or systems associated with third parties or services 502 of the set of services 502) may access operations provided by the services 502 through one or more requests sent over a network 506 using an interface (e.g., a Representational State Transfer (RESTful) interface or the like) provided by at least one of the services 502.

Services infrastructure platform 510 may provide functionality to allow services 502 to be configured (e.g., for particular tenants, according to network addresses, etc.) and provide a communication infrastructure to allow service 502 to communicate with one another such as, for example, to issue requests to another service 502, to receive a response from another service 502 or to otherwise communicate between the services 502. Services 502 may, for example, be adapted to utilize the services infrastructure platform 510 through the inclusion of libraries associated with the interfaces of the services infrastructure platform 510. The services infrastructure platform 510 may itself be implemented as a set of services, applications or other functionality that is accessed through one or more interfaces that may include RESTful interfaces, Application Programming Interfaces (APIs) or other types of interfaces. Additionally, the services infrastructure platform 510 may also be deployed on a deployment platform, which may be the same as, or different, than a cloud computing platform 504 on which the set of services 502 of the service platform are deployed.

In many cases, it may be desired to run a standalone service (e.g., a service that it is desired to run outside the deployed set of services of the software platform) in association with the (e.g., deployed) services that comprise a software platform. This situation often occurs in the context of development of services of such a software platform (e.g., when creating a new service or making updates or fixes to an existing service). For example, a user may be developing a service (e.g., on his own computing device), but in order to test or run the service under development as a standalone service the service may need to interact with the other set of services of the software platform. In certain instances, in fact, the standalone service 502a3 may have other instances of the same service 502a1, 502a2, etc. deployed in the cloud computing platform 504. A tenant may be assigned to the developer or other user such that any standalone services associated with that developer or other user may likewise be associated with same tenant. Such a tenant may be distinct from other tenants whose requests are serviced by the service platform 500.

In an embodiment, then, a standalone service 502a3 may be deployed on a device 525. This device 525 may, for example, be the computing device of a developer or almost any other user who wishes to run such a standalone service 502a3. A standalone service 502a3 may be an instance of a (e.g., type of0 service 502a running in a standalone mode. Running in standalone mode may refer to the fact that the standalone service 502a3 is running remotely from the deployment platform 504 on which the other services 502 are running without any other indicators, or may be a flag or other indicator or variable stored locally (e.g., to the standalone service 502a3) or globally within the services infrastructure 510 or platform 500 that indicates the standalone service 502a3 is operating as a standalone service. Thus, the standalone service 502a3 may be associated with the tenant associated with the developer or other user who is running (e.g., developing) that standalone service 502a3. The standalone service may operate in a standalone mode in a virtual private network (VPN) or virtual private cloud (VPC) with the services infrastructure 510 and the set of deployed services 502 of the service platform. The standalone service 502a3 and the user device 525 thus have access to the resources of the software services platform and the services 502 and services infrastructure platform 510 may have access to the standalone service 502a3 or device 525.

The standalone service 502a3 may also use a service registry interface 527 provided by the services infrastructure 510 to register with the service infrastructure 510 by, for example, sending a registration request with registration information to the service registry interface 527. The registration information for the standalone service 502a3 may include an identifier for the tenant associated with the standalone service 502a3 and an identifier of the service 502*a*3 (e.g., the type of the service 502*a* or instance of the service 502*a*3 or both, such as a name for the type of service). The registration information may also include an IP address or host name of device 525 where the standalone service 502*a*3 may be running or otherwise associated with communicating with the standalone service 502*a*3, or one or more ports where communications (e.g., requests) to the standalone service 502*a*3 may be routed or addressed. Such registration information may be stored in a registration entry in a service registry 529 maintained by the service infrastructure 510. The service registry 529 thus comprises entries for all standalone services (and their associated tenants) that are running in standalone mode at a particular time. In some embodiments, service infrastructure platform 510 may include a configuration interface 512 for allowing services 502 to obtain configuration data for purposes of configuring themselves according to one or more configuration variables. Configuration data 514 may be maintained by the service infrastructure platform 510. This configuration data may include configuration data for each type of service 502 and, in some cases, include configuration data 514 defined on a per service, per tenant basis.

While executing then, an instance of a service 502 (including standalone service 502*a*3) may need to issue requests or otherwise communicate or interact with other services 502 of the software platform. Services 502 may also need to obtain communications (or other interactions) intended for that service 502 from one or more other services 502 of the software services platform 500. Service infrastructure platform 510 may therefore provide one or more communication pathways or associated interfaces and infrastructure to facilitate communication or coordination between the services 502, to allow requests and responses to be issued and received by services 502 or to otherwise allow the services to interoperate or communicate.

As discussed, one mode of communication between services 502 may be through messaging. To facilitate this messaging, services infrastructure 510 may include a messaging platform 550 which may be based on a messaging broker such as Reddis, RabbitMQ or the like. Messaging platform 550 may thus maintain sets 555 of message queues 554. Each set of queues 555 may be associated with a particular service 502 (e.g., type of service), while each queue 554 within each set 555 of queues 554 may be associated with a particular tenant (e.g., entity). Thus, each service 502 may have one or more corresponding sets 555 of queues 554 where each of those queues 554 of the set 555 may be associated with a different tenant that can request various services or functionality from the software platform 500. In that manner, messages associated with servicing requests for a tenant (or otherwise performing tasks associated with requests from those tenants) may be separated into a message queue 554 specific to that tenant. Services 502 wanting to send a message to another service 502 for a particular tenant may thus publish the message to the queue 554 associated with the desired service 502 and tenant.

So, with reference to the depicted example, message queues 554*a* may be associated with service 502*a*. Each of these messages queues 554*a* for service 502*a* may be associated with a different tenant. Thus, for example, message queue 554*a*1 for service 502*a* may be associated with "Tenant A", message queue 554*a*2 for service 502*a* may be associated with "Tenant B", message queue 554*a*3 for service 502*a* associated with "Tenant N", etc. Likewise, message queue 554*b*1 for service 502*b* may be associated with "Tenant A", while message queue 554*b*2 for service 502*b* may be associated with "Tenant B", message queue 554*b*3 for service 502*b* may be associated with "Tenant N", etc. It will be noted here that while not depicted in FIGS. 5A and 5B, there may be multiple sets 555 of message queues, or message queues 554, associated with each service 502, where each of these message queues 554 may be associated with the same or a different set 555 of queues 554 or tenant.

Thus, when a service 502 wishes to send a message to another service 502 (e.g., to make a request to another service 502) the sending service 502 may send a message to that service 502 using message interface 552. Specifically, the service 502 sending the message may form the message associated with a particular tenant and service 502 and send a request to the messaging interface with the message and identifying the service and associated tenant. The messaging interface 552 can then place the message on the message queue 554 associated with the identified service and tenant. Again, if there are multiple sets 555 of queues 554 associated with a particular service 502, the set 555 of queues 554 on which to place the message for the service 502 may also be identified in the request to the messaging interface 552 from the sending service 552.

To continue with the above example, suppose a service 502*a* (e.g., executing instance of that service 502*a*1) wishes to send a message to service 502*b* where that message is associated with performing functionality for Tenant A. The service 502*a* (e.g., executing instance of that service 502*a*1) may send the message to the message interface 552 along with an identification of service 502*b* and that tenant (Tenant A). The messaging interface 552 can then place the received message on message queue 554*b*1 of the set 555*b* of message queues 554*b* corresponding to service 502*b* and Tenant A.

Thus, services 502 are configured to monitor queues 554 (e.g., associated with that service 502). Specifically, services 502 may be updated periodically with a configuration of which queues 554 to monitor such that when a message is available on one of the monitored queues 554 the service 502 may scan the queues it is configured to monitor using messaging interface 552 obtain the message from the monitored queue 554. The service 502*a* can then process any obtained messages (e.g., perform the service requested by the message). Specifically, each instance of a service 502 may scan queues 554 associated with that service 502 and all tenants to obtain the messages for that service 502 on the queues 554 being scanned to obtain messages associated with all tenants. So for example, instances 502*a*1, 502*a*2 of service 502*a* may each scan queues 554*a*1 for Tenant A, 554*a*2 for Tenant B, 554*a*4 for Tenant C, 554*a*3 for Tenant N, etc. using message interface 552 to obtain messages for that service 502*a* and process those messages.

As may be understood from the discussion herein, it is desirable that messages for service 502*a* associated with the tenant of standalone service 502*a*3 should be routed to standalone service 502*a*3 while requests for service 502*a* associated with other tenants should be routed accordingly (e.g., to other instances of the service 502*a* deployed on deployment platform 504 or to other standalone services (not shown) associated with those tenants that may be running).

In one embodiment, then, each instance of a service 502 deployed on deployment platform 504 may operate in a standalone aware mode, whereby each instance of the service 502 may configure the message queues it monitors based on the service registry 529 having entries for standalone services. Specifically, according to one embodiment, at some interval (e.g., a time interval) each instance 502*a*1, 502*a*2, 502*b*1, 502*b*2, 502*n*1, 502*n*2 of an executing service 502 operating in standalone aware mode (e.g., the instances of services deployed on the deployment platform of the software services platform) may scan queues 554 associated with its type of service 502 (e.g., the type of service 502 of that service instance 502a1, 502a2, 502b1, 502b2, 502n1, 502n2) to determine if there are any messages for processing. Each time the scan of monitored queues 554 is preformed the instance of the service 502a1, 502a2, 502b1, 502b2, 502n1, 502n2 may access the service registry 529 to determine if there any instances 502a1, 502a2, 502b1, 502b2, 502n1, 502n2 of the same type of service 502 in standalone mode (e.g., if there are any registry entries in the service registry 529 for the same type of service). If there are any instances of the same type of service 502 in standalone mode, the tenants associated with those instances of standalone services of the same type may be obtained from the service registry entries associated with those standalone services. The instance of the service 502a1, 502a2, 502b1, 502b2, 502n1, 502n2 can then scan the message queues 554 for that service that are not associated with those tenants and process any messages obtained from those monitored queues 554.

Similarly, standalone service 502a3 operating in standalone mode may be configured with the tenant associated with that service (e.g., the tenant associated with the developer on whose device 525 the standalone service 502a3 is executing). Thus, a standalone service 502a3 operating in standalone mode may be configured to scan message queues 554 associated with its type of service (e.g., the type of service of that standalone service) associated with that tenant. In this manner, all messages for that type of service 502a associated with that tenant may be obtained by the standalone service 502a3 while messages for that service 502a for other tenants may be obtained and processed by the instances of that type of service 502a1, 502a2, deployed on the deployment platform 504 or, in cases where other instances of standalone services for that type of service 502a are running for other tenants, messages for that service 502a and those tenants may be obtained by the respective standalone services for those tenants.

With reference to an example, message queues 554a may be associated with the type of service 502a where each of these messages queues 554a for service 502a may be associated with a different tenant. Thus, for example, message queue 554a1 for service 502a may be associated with "Tenant A", message queue 554a2 for service 502a may be associated with "Tenant B", message queue 554a4 for service 502a may be associated with Tenant C, message queue 554a3 for service 502a associated with "Tenant N", etc.

Suppose now that standalone service 502a3 on device 525 is associated with "Tenant N". Thus, service registry 529 may include an entry for the standalone service 502a3 including an identifier for Tenant N associated with the standalone service 502a3 and an identifier of the service 502a3 (e.g., the type of the service 502a or instance of the service 502a3 or both, such as a name of service 502a). Thus, each instance 502a1, 502a2 of a service 502a deployed on deployment platform 504 may operate in a standalone aware mode, whereby each instance of the service 502a may configure the message queues 554a it monitors based on the service registry 529 having entries for standalone service 502a3. Specifically, according to one embodiment, at some interval (e.g., a time interval) each instance 502a1, 502a2 of executing service 502a operating in standalone aware mode may scan set 555a of queues 554a for service 502a to determine if there are any messages for processing.

Each time the scan of monitored set 555a of queues 554a for service 502a is preformed the instance of the service 502a1, 502a2 in standalone aware mode may access the service registry 529 to determine if there any instances of the same type of service 502 in standalone mode (e.g., if there are any registry entries in the service registry 529 for the same type of service). When the instances of the service 502a1, 502a2 determine there is a registry entry for service 502a3 operating in standalone mode, the instances of the service 502a1, 502a2 may can then scan the message queues 554a1 for Tenant A, queue 554a2 for Tenant B and queue 554a5 for Tenant C of set 555a associated with service 502a that are not associated with Tenant N and process any messages obtained from those monitored queues 554a1, 554a2, 554a3.

Similarly, standalone service 502a3 operating in standalone mode may be configured with Tenant N associated with that service 502a3. Thus, standalone service 502a3 operating in standalone mode is configured to scan message queue 554a3 of set 555a associated with service 502a and Tenant N. In this manner, all messages for that type of service 502a associated with Tenant N may be obtained by the standalone service 502a3 while messages for that service 502a for other tenants may be obtained and processed by the other instances of that type of service 502a1, 502a2, deployed on the deployment platform 504 (or another standalone service).

To facilitate the use of service registry 529 while not resulting in a delay or other processing bottleneck caused by accessing the service registry 529 through the service registry interface 527, in one embodiment each instance of a service 502a1, 502a2, 502b1, 502b2, 502n1, 502n2 running in standalone aware mode (or all instances of a service 502) may keep a local copy (e.g., a cached copy) of the service registry 529. Such a copy of the service registry 529 may be accessed through, for example, service registry interface 527. To keep the cache of the service registry 529 up to date, in one embodiment a cache invalidation strategy based on system messages may be utilized.

Thus, when a standalone service 502a3 registers with the service infrastructure 510 by, for example, sending a registration request with registration information to the service registry interface 527, the standalone service 502a3 may also issue a broadcast or system wide startup message to all other (executing instances of) services 502 in the software services platform 500. When a service 502 receives such a standalone service startup message, the service 502 may invalidate its local cached copy of the service registry 529 and access service registry interface 527 to obtain the most recent copy of the service registry 529 to cache. Similarly, when a standalone service 502a3 exits and sends a send a deregistration request to service registry interface 527 to remove the entry corresponding to the standalone service 502a3 from the service registry, the standalone service 502a3 may also issue a broadcast or system wide shut down message to all other (executing instances of) services 502 in the software services platform 500. When a service 502 receives such a standalone service shutdown message, the service 502 may invalidate its local cached copy of the service registry 529 and access service registry interface 527 to obtain the most recent copy of the service registry 529 to cache.

Figure 6A:
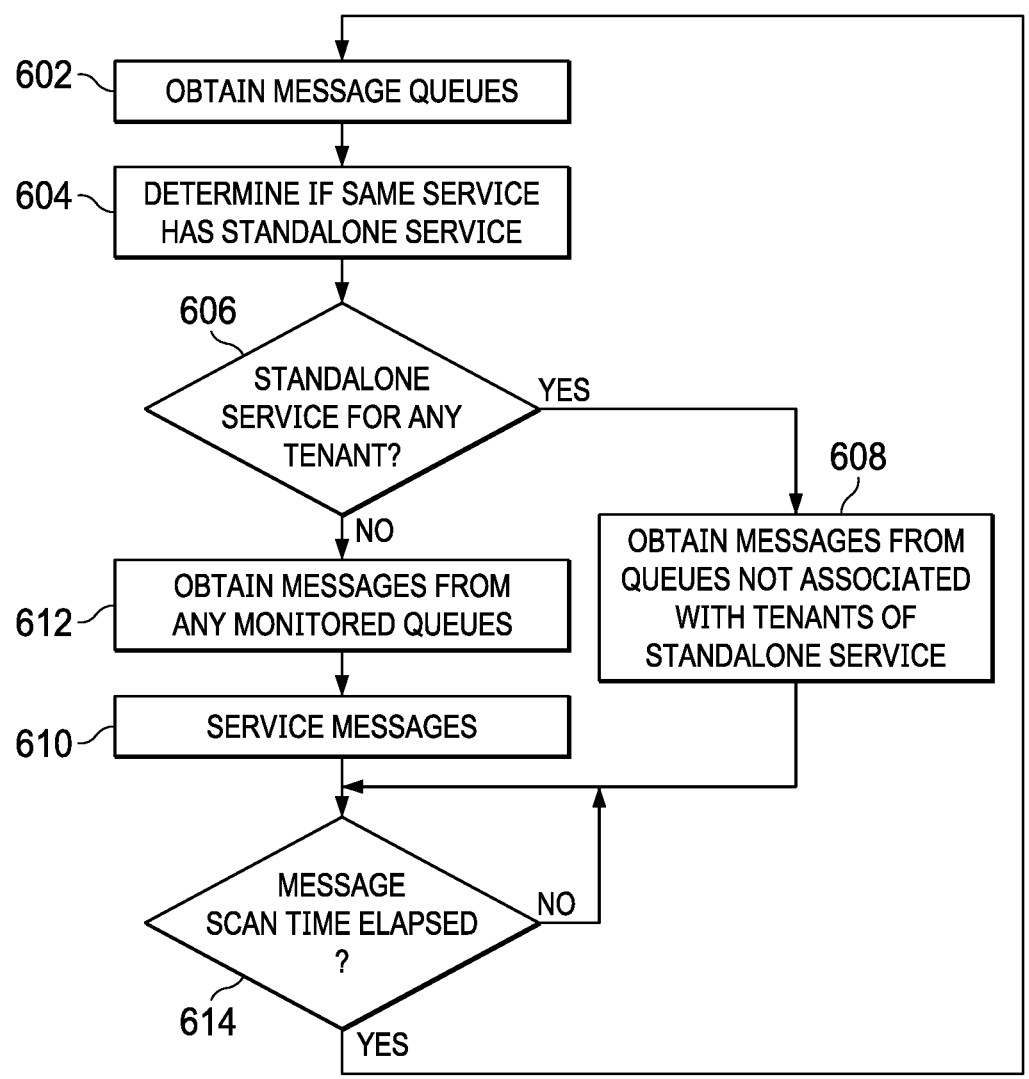
FIGS. 6A and 6B are flow diagrams of embodiments of a method for communication that may be employed by a software services platform.
Figure 6B:
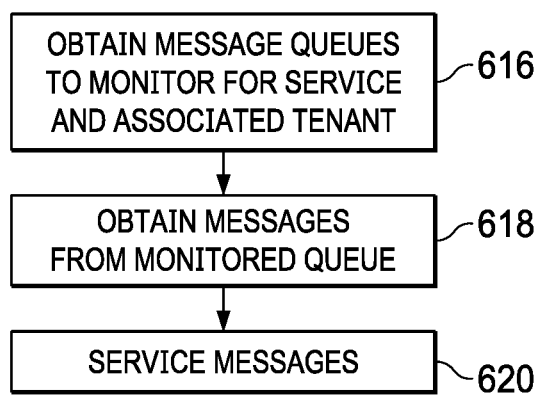

Looking now at FIGS. 6A and 6B, embodiments of methods for utilizing a service registry of a services infrastructure to facilitate communications between services using a messaging platform are depicted. Specifically, FIG. 6A depicts one embodiment of a method for a standalone aware service to obtain messages for that service. As discussed, services may be configured to monitor queues associated with that (type of) service. At some time interval the message queues associated with the type of service may be scanned. In one embodiment, services may be updated periodically with a configuration of which queues to monitor such that when a message is available on one of the monitored queues the service may scan the queues it is configured to obtain message from the monitored queue. Thus, a standalone aware service may obtain, or be configured with, a list of message queues to monitor (STEP 602). The standalone aware service then determine if there any instances of the same type of service running in standalone mode (STEP 604). This determination can be made, for example, by accessing a service registry including entries for such standalone service and determining if there are any registry entries in the service registry for the same type of service.

If there are any instances of the same type of service in standalone mode for a tenant (Y brand of STEP 606), the tenants associated with those instances of standalone services of the same type may be obtained from the service registry entries associated with those standalone services. The instance of the standalone service can then scan the message queues for that service that are not associated with those tenants (STEP 608) and process any messages obtained from those monitored queues (STEP 610). For example, if there are any instances of the same type of service in standalone mode, the tenants associated with those instances of standalone services of the same type may be obtained from the service registry entries associated with those standalone services. The instance of the service can then scan the message queues for that service that are not associated with those tenants and process any messages obtained from those monitored queues. If there are no instances of the of the same type of service in standalone mode for a tenant (N branch of STEP 606), the service may scan all the message queues configured for that service (STEP 612) to obtain messages and process any messages obtained from those monitored queues (STEP 610). At the end of the time interval the message queues may be scanned again (STEP 614).

FIG. 6B depicts one embodiment of a method for a standalone service to obtain messages for that service. Here, a standalone service operating in standalone mode may be configured with the tenant associated with that service. Thus, a standalone service operating in standalone mode may be configured to obtain the queues to monitor for that type of service and its associated tenant (STEP 616) and scan those message queues to obtain messages from these monitored queues (STEP 618). The standalone service can then process any messages obtained from those monitored queues (STEP 620). In this manner, all messages for that type of service associated with that tenant may be obtained by the standalone service while messages for that service for other tenants may be obtained and processed by other instances of that type of service.

While direct communication and messaging may be used by services in the software services platform, there may be still other modes by which services of a services platform communicate through the services infrastructure. It is desirable that the service infrastructure of a services platform adapt these other modes of communication such that these other modes of communication may still be utilized by the services of the platform while still ensuring that the standalone service can run in association with the other standalone aware services deployed on the deployment platform, including where the deployed services include other instances of the same service that is under development.

Again it is desirable that the service infrastructure and standalone aware services may cooperate to ensure that that communications (e.g., requests or response) associated with the standalone service in standalone mode and the tenant associated with the standalone service are routed to that standalone service, while communications for the other services deployed in the services platform may continue communicating to receive and servicing requests for those services (and instances of deployed services that are of the same service as the standalone service continue receiving communications for that service for other tenants).

As previously referred to, another method of communication between services of a software services platform may include events. In some embodiments, then, in addition to a messaging platform and direct requests, a service infrastructure may also provide an event platform as yet another mode by which services of the service platform may communicate with one another. Such an event platform may be based on Apache's Kafka stream processing platform or the like. Here, events may be grouped by topic, where the events of each topic may be subdivided into partitions. Events for different tenants that utilize service platform may thus be co-located across the different partitions of a topic.

Accordingly, services may operate as publishers (producers) and consumers of events. When publishing an event for another service, a service may determine the tenant with which the event is associated and publish the event to a particular topic. Conversely, services may subscribe to particular topics. Events on the partitions of topics can then be delivered to those services (e.g., services instances) subscribed to that topic. When a service receives an event for a tenant the service can then process the event.

In one embodiment, then, it is desired to ensure that events for a standalone service for a tenant are routed to that standalone service, while allowing events for the same service for other tenants, or events for other services, are still routed to the appropriate service (e.g., a standalone service for that combination of service and tenant if it is running or an instance of the service on the deployment platform of the services platform). This configuration may be accomplished by reserving partitions of each topic for the tenant associated with a standalone service.

Specifically, according to one embodiment, when a standalone service is started, in addition to registering with the service registry as described, the standalone service may reserve one or more partitions of each topic to which it will subscribe (or to which it is subscribed) for the tenant associated with the standalone service. Reserved partitions for topics are stored in a partition registry storing partition reservation entries mapping a topic to an identifier for a tenant and identifiers for the one or more reserved partitions.

Thus, when a service is going to publish an event for a tenant in a topic the service may access the partition registry to determine if any partitions for that topic are reserved for that tenant or if any other partitions are reserved for any other tenants for the topic. If there is a partition (e.g., one or more) partitions reserved for that tenant for the topic, the service can publish the event to the reserved partition for that tenant for the topic. If however, no partitions for that topic are reserved for that tenant, the service may publish the event to any partition for the topic that is not reserved for another tenant.

A standalone service may thus be configured to receive events from the subscribed topic, and in particular may be configured to consume events from the reserved partitions of the topic for its associated tenant. The standalone service can then determine the tenant associated with the received event. If the received event is associated with the tenant associated with the standalone service, the standalone service may handle the event. Otherwise, the standalone service can access the partition registry to determine if any partitions for that topic are reserved for the determined tenant for the event or if any other partitions are reserved for any other tenants for the topic. If there is a partition (e.g., one or more) partitions reserved for the determined tenant for the event, the service can publish the event to the reserved partition for that determined tenant for the topic. If however, no partitions for that topic are reserved for the determined tenant, the service may publish the event to any partition for the topic that is not reserved for another tenant. In this manner, by checking the tenant of the event, despite that the event was consumed from a reserved partition, events that were placed on reserved partitions before those partitions were reserved by the standalone service may be accounted for.

Similarly, a service operating in standalone aware mode may consume events from the other partitions of the topic (e.g., the partitions other than the partitions reserved by specific tenants). The standalone aware service may then determine the tenant associated with the received event. The standalone aware service can access the partition registry to determine if any partitions for the topic are reserved for the determined tenant for the event and the identity of the reserved partitions for that tenant if any are reserved. If no partitions are reserved for the determined tenant the standalone aware service may handle the event. If there are partitions reserved for the determined tenant for the event (e.g., and the event was not received on one of those reserved partitions), the standalone aware service may republish the received event on one of the identified reserved partitions for the tenant. Again, by checking the tenant of the event, events that were placed on unreserved partitions before certain partitions were reserved by the standalone service may be accounted for.

Figure 7A:
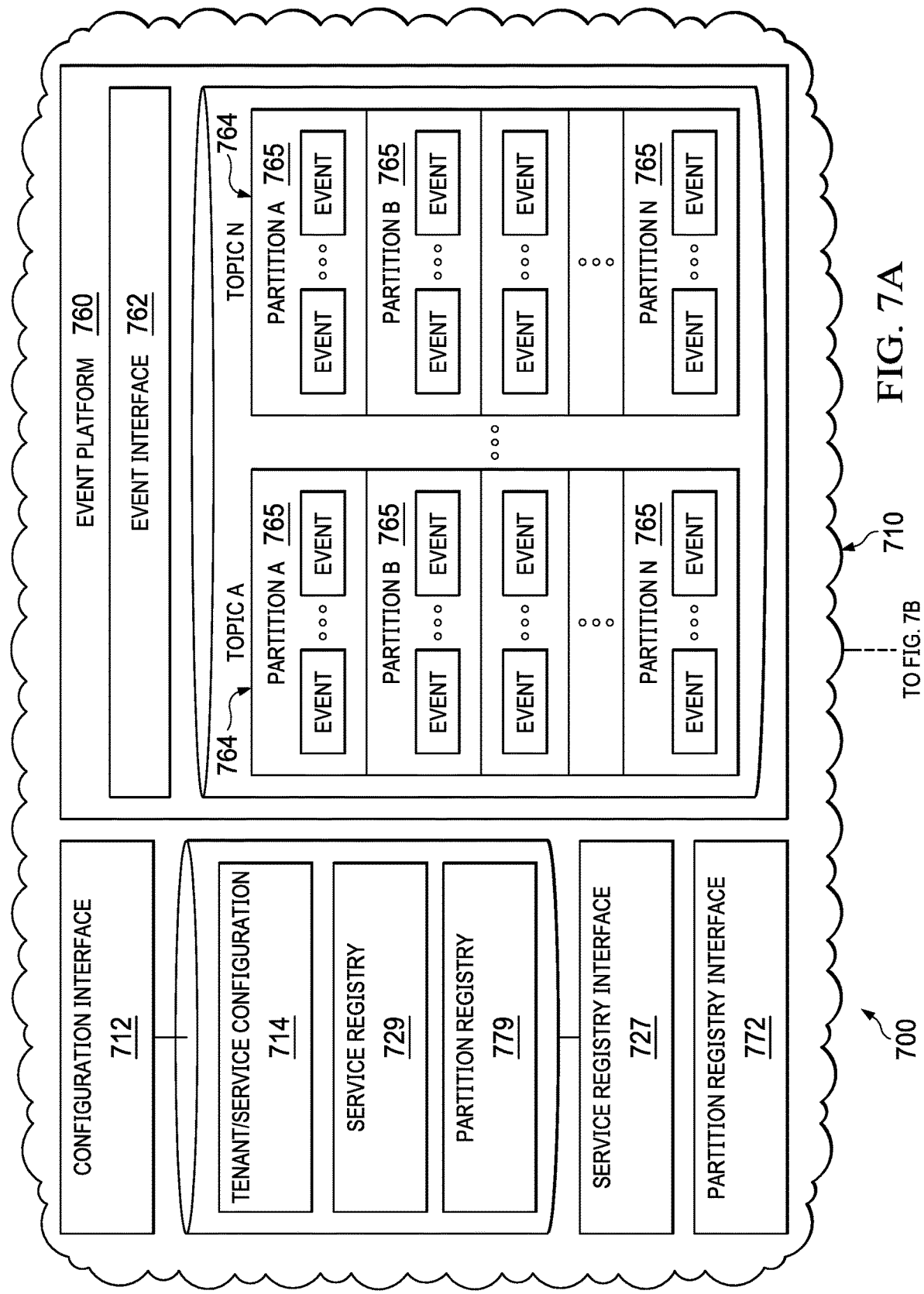
FIGS. 7A and 7B are a block diagram of a distributed networked computer environment including one embodiment of a software services platform.
Figure 7B:
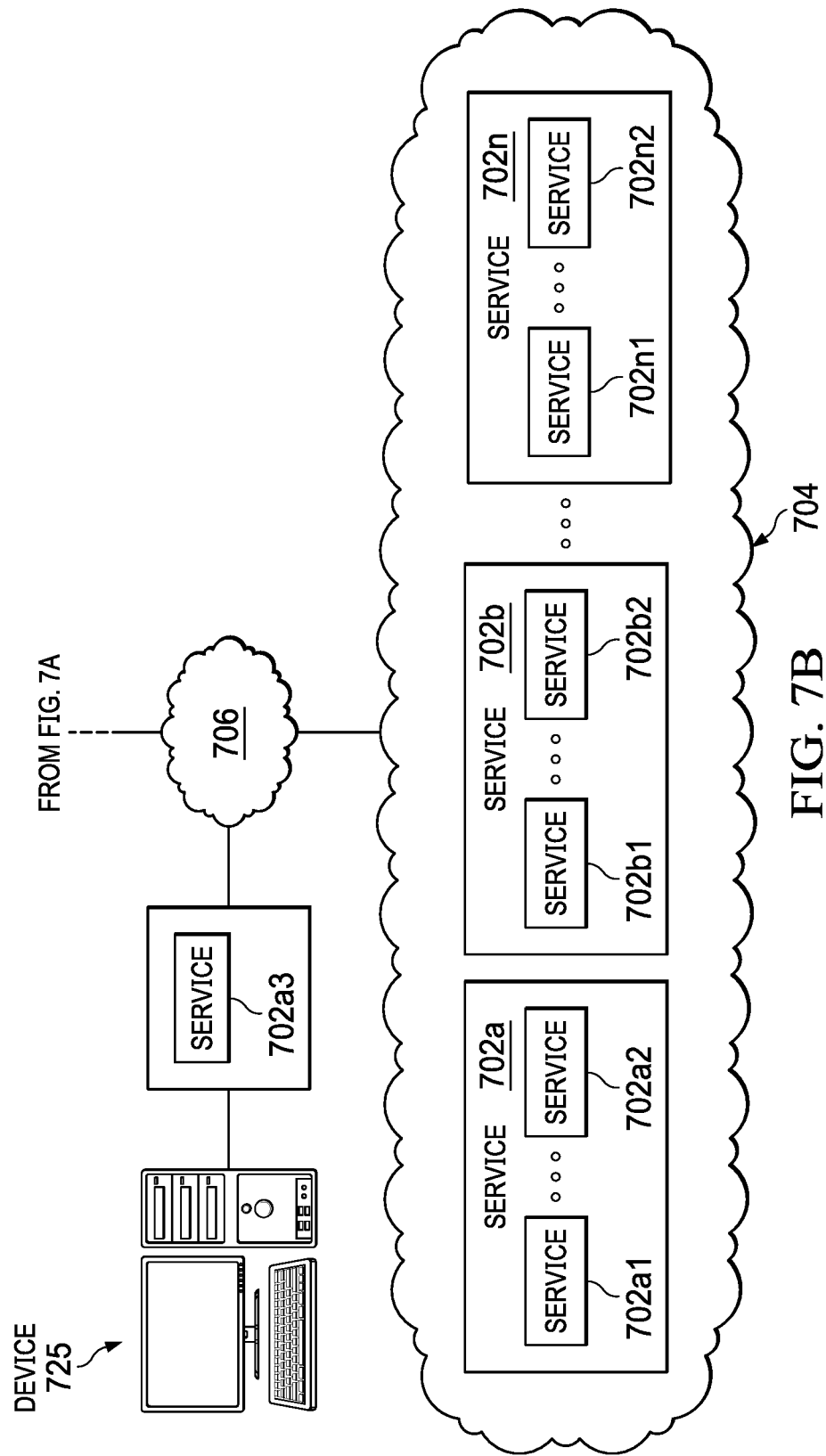

Embodiments of a software service platform that utilize an event platform are depicted in FIGS. 7A and 7B. Again, the software services platform 700 may include a service platform comprising a set of services 702 (e.g., 702*a*, 702*b*, 702*n*) that may cooperate to implement particular functionality (e.g., solutions, applications, etc.) along with services infrastructure platform 710 that provides the communications and other infrastructure that allows the services 702 to interoperate or otherwise coordinate with one another to implement that functionality. Services 702 may be deployed on deployment platform 704, such as a cloud computing platform, and may be deployed according to a microservices architecture. Certain aspects of the software services platform 700 may be similar to those described with respect to other embodiments of software services platform described herein as will be understood.

The set of services 702 for the services platform may be multitenant services such that each of the set of services 702 may handle requests associated with different tenants (e.g., entities, organizations, groups, or any collection or group of associated devices, software or users). To facilitate the handling of a large number of these requests across multiple tenants, each service (e.g., 702*a*, 702*b*, 702*n*, etc.) may have multiple instances of that (e.g., type of) service 202 executing on the deployment platform 704 (e.g., service 702*a* of a first type may have executing instance 702*a*1, 702*a*2, etc.). Thus, a service (e.g., 702*a*) may be thought of as single logical service implemented by multiple executing instances (e.g., 702*a*1, 702*a*2, etc.) of that service (e.g., 702*a*). The multiple executing instances (e.g., 702*a*1, 702*a*2, etc.) are thus adapted to service the requests intended for the logical service (e.g., 702*a*). Services 702 of the service platform thus cooperate to perform the functionality of the software service platform 700.

Accordingly, requesters (e.g., clients such as other services or systems associated with third parties or services 702 of the set of services 702) may access operations provided by the services 702 through one or more requests sent over a network 706 using an interface (e.g., a Representational State Transfer (RESTful) interface or the like) provided by at least one of the services 702.

Services infrastructure platform 710 may provide functionality to allow services 702 to be configured (e.g., for particular tenants, according to network addresses, etc.) and provide a communication infrastructure to allow service 702 to communicate with one another such as, for example, to issue requests to another service 702, to receive a response from another service 702 or to otherwise communicate between the services 702. Services 702 may, for example, be adapted to utilize the services infrastructure platform 710 through the inclusion of libraries associated with the interfaces of the services infrastructure platform 710. The services infrastructure platform 710 may itself be implemented as a set of services, applications or other functionality that is accessed through one or more interfaces that may include RESTful interfaces, Application Programming Interfaces (APIs) or other types of interfaces. Additionally, the services infrastructure platform 710 may also be deployed on a deployment platform, which may be the same as, or different, than a cloud computing platform 704 on which the set of services 702 of the service platform are deployed.

In many cases, it may be desired to run a standalone service (e.g., a service that it is desired to run outside the deployed set of services of the software platform) in association with the (e.g., deployed) services that comprise a software platform. This situation often occurs in the context of development of services of such a software platform (e.g., when creating a new service or making updates or fixes to an existing service). For example, a user may be developing a service (e.g., on his own computing device), but in order to test or run the service under development as a standalone service the service may need to interact with the other set of services of the software platform. In certain instances, in fact, the standalone service 702*a*3 may have other instances of the same service 702*a*1, 702*a*2, etc. deployed in the cloud computing platform 704. A tenant may be assigned to the developer or other user such that any standalone services associated with that developer or other user may likewise be associated with same tenant. Such a tenant may be distinct from other tenants whose requests are serviced by the service platform 700.

In an embodiment, then, a standalone service 702*a*3 may be deployed on a device 725. This device 725 may, for example, be the computing device of a developer or almost any other user who wishes to run such a standalone service 702*a*3. A standalone service 702*a*3 may be an instance of a (e.g., type of0 service 702*a* running in a standalone mode. Running in standalone mode may refer to the fact that the standalone service 702*a*3 is running remotely from the deployment platform 704 on which the other services 702 are running without any other indicators, or may be a flag or other indicator or variable stored locally (e.g., to the standalone service 702*a*3) or globally within the services infrastructure 710 or platform 700 that indicates the standalone service 702a3 is operating as a standalone service. Thus, the standalone service 702a3 may be associated with the tenant associated with the developer or other user who is running (e.g., developing) that standalone service 702a3. The standalone service may operate in a standalone mode in a virtual private network (VPN) or virtual private cloud (VPC) with the services infrastructure 710 and the set of deployed services 702 of the service platform. The standalone service 702a3 and the user device 725 thus have access to the resources of the software services platform and the services 702 and services infrastructure platform 710 may have access to the standalone service 702a3 or device 725.

The standalone service 702a3 may also use a service registry interface 727 provided by the services infrastructure 710 to register with the service infrastructure 710 by, for example, sending a registration request with registration information to the service registry interface 727. The registration information for the standalone service 702a3 may include an identifier for the tenant associated with the standalone service 702a3 and an identifier of the service 702a3 (e.g., the type of the service 702a or instance of the service 702a3 or both, such as a name for the type of service). The registration information may also include an IP address or host name of device 725 where the standalone service 702a3 may be running or otherwise associated with communicating with the standalone service 702a3, or one or more ports where communications (e.g., requests) to the standalone service 702a3 may be routed or addressed. Such registration information may be stored in a registration entry in a service registry 729 maintained by the service infrastructure 710. The service registry 729 thus comprises entries for all standalone services (and their associated tenants) that are running in standalone mode at a particular time. Additionally, in some embodiments, service infrastructure platform 710 may include a configuration interface 712 for allowing services 702 to obtain configuration data for purposes of configuring themselves according to one or more configuration variables. Configuration data 714 may be maintained by the service infrastructure platform 710. This configuration data may include configuration data for each type of service 702 and, in some cases, include configuration data 714 defined on a per service, per tenant basis.

While executing then, an instance of a service 702 (including standalone service 702a3) may need to issue requests or otherwise communicate or interact with other services 702 of the software platform. Services 702 may also need to obtain communications (or other interactions) intended for that service 702 from one or more other services 702 of the software services platform 700. Service infrastructure platform 710 may therefore provide one or more communication pathways or associated interfaces and infrastructure to facilitate communication or coordination between the services 702, to allow requests and responses to be issued and received by services 702 or to otherwise allow the services to interoperate or communicate.

One mode of communication between services 702 may be an event platform 760 that services 702 of the service platform 700 may utilize to communicate with one another. Here, events may be grouped by topic 764, where the events of each topic 764 may be subdivided into partitions 765. The number of partitions 765 for a given topic 764 may be configurable. For example, in one embodiment the number of partitions 765 for a topic 764 may include sixteen partitions 765, eight partitions 765, four partitions 765, etc. Each of the partitions 765 may be associated with an identifier that identifies that partition 765. Events for different tenants that utilize service platform 700 may thus be co-located across the different partitions of a topic. In particular, in some cases each topic 765 may be associated with a pod comprising a group of tenants of the software services platform 700. Events for tenants of that pod may thus be co-located and intermingled across the partitions of that topic 765 for the pod.

Accordingly, services 702 may operate as publishers (producers) and consumers of events. When publishing an event for another service 702, a service 702 may determine the tenant with which the event is associated and publish the event to the topic 765 using the event interface 762 of the event platform 760. The event can then be placed on a partition 764 of that topic 765 by the event interface 762. Conversely, services 702 may subscribe to particular topics 765 using the event interface 762 of the event platform 760. The event platform 760 can then deliver events on the partitions 764 of topics 765 to those services 702 (e.g., services instances) subscribed to that topic. When a service 702 receives an event from the event platform 760 the service 702 can then process the event accordingly.

As may be understood from the discussion herein, it is desirable that events for service 702a associated with the tenant of standalone service 702a3 should be routed to standalone service 702a3 for processing while events for service 702a associated with other tenants should be routed accordingly (e.g., to other instances of the service 702a deployed on deployment platform 704 or to other standalone services (not shown) associated with those tenants that may be running).

In one embodiment then, services infrastructure 710 may include a partition registry 779 and an associated partition registry interface 772. Partition registry 779 stores reserved partitions for topics by storing partition reservation entries mapping a topic to an identifier for a tenant and identifiers for the one or more reserved partitions. Partition registry interface 772 may provide an interface by which partitions for topics can be reserved (and thus a partition registry entry created in partition registry 779), or through which partition registry 779 accessed to determine, for instance, if a topic or tenant has any associated partition reservation entries (e.g., what, if any, partitions are reserved for a tenant for a topic, etc.).

Accordingly, in one embodiment, when the partition registry interface 772 receives a request for a reserved partition for a tenant from a standalone service 702a3 the partition registry interface 772 may access the partition reservation entries of partition registry 779 to determine if there are any unreserved partitions 765 for that topic 764. If there are no unreserved partitions for that topic a failure response may be returned to the standalone service 702a3. Otherwise, the partition registry interface 772 may determine one or more partitions 765 of the topic 764 to reserve for the standalone service 702a3 and return identifiers for these partitions 765 to the standalone service 702a3. Additionally, the partition registry interface 772 may create a partition reservation entry in partition registry 779 identifying those partitions 765 for that topic 764 as reserved for that tenant.

When a standalone service 702a3 exits, the standalone service 702a3 may also issue a broadcast or system wide shut down message to the software services platform 700 including the partition registry interface 772. When the partition registry interface 772 receives such a standalone service shutdown message, the partition registry interface 772 may remove any reserved partitions 765 for the tenant associated with the standalone service 702a3 from any partition reservation entries of the partition registry interface 772.

In one embodiment then, when event platform 760 creates a topic 764 and corresponding partitions 765 for that topic 764, the event platform 760 may determine a number of partitions 765 for the topic and send a request to partitions registry interface 772 specifying the name of the topic 764 and the number of partitions 765 of the topic 764. An entry in the partition registry 779 defining for the topic 764 and indicating the number of partitions of the topic 764 can then be created in the partition registry 779. Moreover, to ensure that all partitions 765 do not become reserved, the event platform 760 may reserve one or more partitions 765 of the created topic 764 as general topics for use with all tenants. Thus, for example, event platform 760 may access partition registry interface 772 and request one or more partitions 765 (e.g., the first two partitions 765 or the like) be reserved as general partitions 765 for the topic 764. The partition registry interface 772 may create a partition reservation entry for that topic 764 in the partition registry 779 identifying those partitions 765 for that topic 764 as reserved as general partitions. In this manner, no matter the number of standalone services 702a3 running there is always at least one partition 765 available one which to publish (and consume) events for tenants (e.g., tenants other than those associated with the running standalone services 702a3).

Thus, when a standalone service 702a3 is started in standalone mode, in addition to registering with the service registry 729 as described, the standalone service 702a3 may access partition registry interface 772 to reserve one or more partitions 765 of a topic 764 to which that standalone service 702a3 will subscribe (or to which it is subscribed) for the tenant associated with the standalone service. If the standalone service 702a3 receives a failure notice from the partition registry interface 772 the standalone service 702a3 may shut down. If however, the standalone service 702a3 receives identifiers of partitions 765 for the topic 764 from the partition registry interface 772 the standalone service 702a3 may be configured to monitor those partitions 765 of the topic 764. The partitions 765 reserved for that topic 764 for the tenant associated with standalone service 702a3 are stored in partition registry 779 by storing partition reservation entry mapping the topic 764 to the identifier for that tenant and identifiers for the one or more reserved partitions.

To illustrate, one example of entries in a partition registry is below:
Beacon Config: V1:branding_echo:ets:
{"topicId":"branding_echo","numPartitions":8,"config": {"domingo-test-org":[1,2]}}
Beacon Config: V1:branding_echo:hermes-narayan:
{"topicId":"branding_echo","numPartitions":8,"config": {"diego-test":[1,2],"nauto2":[3,4]}}
Beacon Config: V1:cc_echo:hermes-narayan:
{"topicId":"cc_echo","numPartitions":8,"config":{"diego-test":[1,2],"nauto2":[3,4]}}
Beacon Config: V1:entitlement_padre:rats:
{"topicId":"entitlement_padre","numPartitions":8,"config":{"role-perf":[1,2]}}
Beacon Config: V1:notification_echo:hermes-narayan:
{"topicId":"notification_echo","numPartitions":16,"config":{"diego-test":[1,2],"nauto2":[3,4]}}
Beacon Config: V1:notification_megapod-useast1: hermes:
{"topicId":"notification_megapod-useast1","numPartitions":16,"config":{"echo-test":[1,2]}}
Beacon Config: V1:org_lifecycle_buoy:cms:
{"topicId":"org_lifecycle_buoy","numPartitions":16, "config":{"navcorp":[1,2]}}
Beacon Config: V1:org_lifecycle_echo:hermes-narayan:
{"topicId":"org_lifecycle_echo","numPartitions":16, "config":{"diego-test":[1,2],"nauto2":[3,4]}}
Beacon Config: V1:org_lifecycle_echo:spies:
{"topicId":"org_lifecycle_echo","numPartitions":16, "config":{"vasiltest":[1,2]}}
Beacon Config: V1:org_lifecycle_megapod-useast1: hermes:
{"topicId":"org_lifecycle_megapod-useast1","numPartitions":16,"config":{"echo-test":[1,2]}}
Beacon Config: V1:service_started:ets:
{"topicId":"service_started","numPartitions":4,"config": {"sangjintest":[1,2]}}

Thus, for example, in the partition registry entry: Beacon Config: V1:branding_echo:ets:{"topicId":"branding_echo", "numPartitions":8,"config":{"domingo-test-org":[1,2]}} indicates that the topic named "branding_echo" has eight partitions with partitions numbered "1" and "2" reserved for the tenant "domingo-test-org".

Accordingly, when a service 702 is going to publish an event for a tenant in a topic 764 the service 702 may access the partition registry 779 through partition registry interface 772 to determine if any partitions 765 for that topic 764 are reserved for that tenant, or if any other partitions 765 are reserved for any other tenants for the topic 764. If there is a partition 765 (e.g., one or more) reserved for that tenant for the topic 764, the service 702 can publish the event to the reserved partition for that tenant for the topic 764. If however, no partitions 765 for that topic 764 are reserved for that tenant, the service 702 may publish the event to any partition 765 for the topic 764 that is not reserved for another tenant.

A standalone service 702a3 may be configured to receive events from a subscribed topic 764, and in particular may be configured to consume events from the reserved partitions 765 of the topic 764 for its associated tenant. The standalone service 702a3 can then determine the tenant associated with the received event. If the received event is associated with the tenant associated with the standalone service 702a3, the standalone service 702a3 may handle the event. Otherwise, the standalone service 702a3 can access the partition registry 779 through partition registry interface 772 to determine if any partitions 765 for that topic are reserved for the determined tenant for the event, or if any other partitions 765 are reserved for any other tenants for the topic 764.

If there is a partition 765 (e.g., one or more partitions) reserved for the determined tenant for the event, the standalone service 702a3 can publish the event to the reserved partition 765 for that determined tenant for the topic 764. If however, no partitions 765 for that topic 764 are reserved for the determined tenant, the service 702a3 may publish the event to any partition 765 for the topic 764 that is not reserved for another tenant. In this manner, by checking the tenant of the event, despite that the event was consumed from a reserved partition 765, events that were placed on reserved partitions 765 before those partitions 765 were reserved by the standalone service 702a3 may be accounted for.

Similarly, a service 702 operating in standalone aware mode may consume events from the other partitions 765 of the topic 764 (e.g., the partitions 765 other than the partitions reserved by specific tenants). The standalone aware service 702 may then determine a tenant associated with the received event. The standalone aware service 702 can access the partition registry 779 through partition registry interface 772 to determine if any partitions 765 for the topic 764 are reserved for the determined tenant for the event, and the identity of the reserved partitions 765 for that tenant if any partitions 765 are reserved. If no partitions 765 are reserved for the determined tenant the standalone aware service 702 may handle the event. If there are partitions 765 reserved for the determined tenant for the event (e.g., and the event was not received on one of those reserved partitions 765), the standalone aware service 702 may re-publish the received event on one of the identified reserved partitions 765 for the tenant. Again, by checking the tenant of the event, events that were placed on unreserved partitions 765 before certain partitions 765 were reserved for a tenant by the standalone service 702$a$3 may be accounted for.

As the partition registry 779 may be utilized by many or all instances of the services 702 of the services platform 700, to facilitate the use of partition registry 779 while not resulting in a delay or other processing bottleneck caused by accessing the partition registry 779 through the partition registry interface 772, in one embodiment each instance of a service 702$a$1, 702$a$2, 702$a$3, 702$b$1, 702$b$2, 702$n$1, 702$n$2 may keep a local copy (e.g., a cached copy) of the partition registry 779. Such a copy of the partition registry 779 may be cached or updated by, for example, using a push notification provided by the event platform 760 such as by using a KStream or KTable in Apache's Kafka.

Figure 8A:
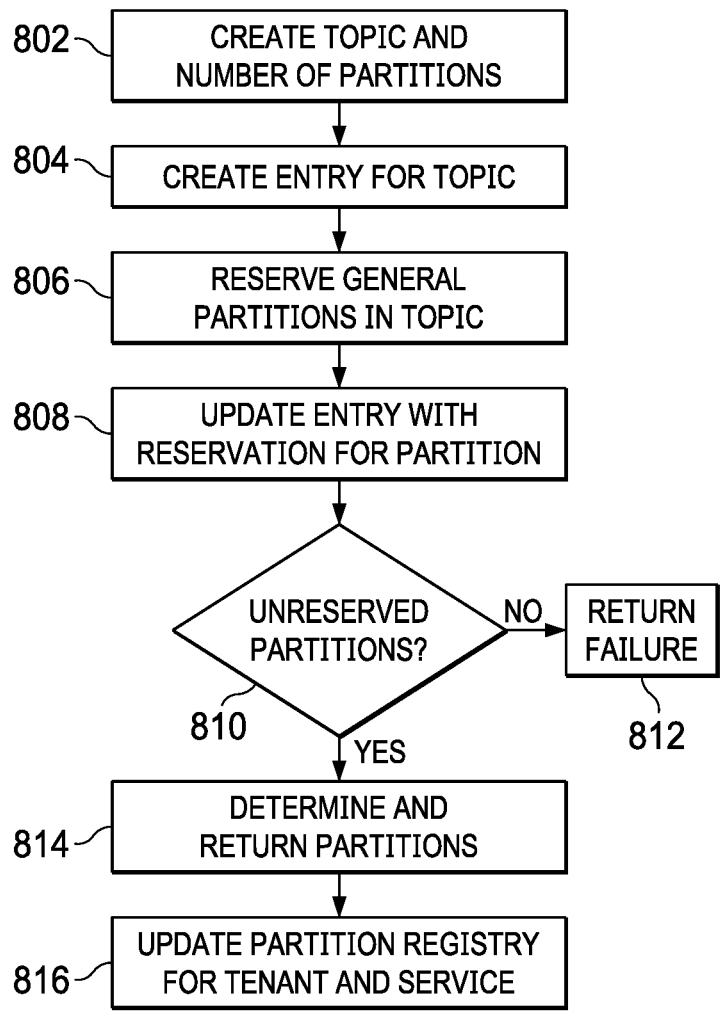
FIGS. 8A, 8B and 8C are flow diagrams of embodiments of a method for communication that may be employed by a software services platform
Figure 8B:
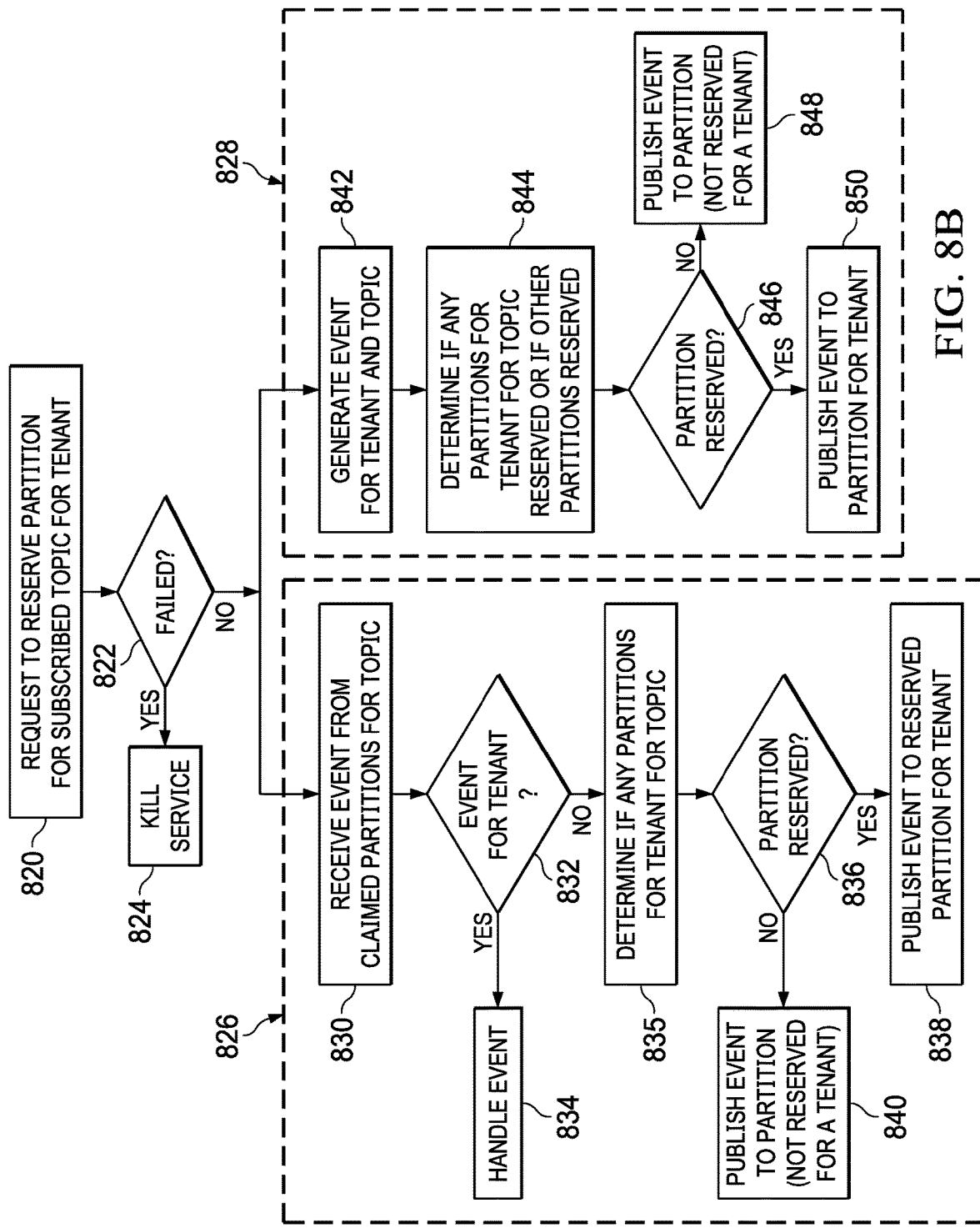
Figure 8C:
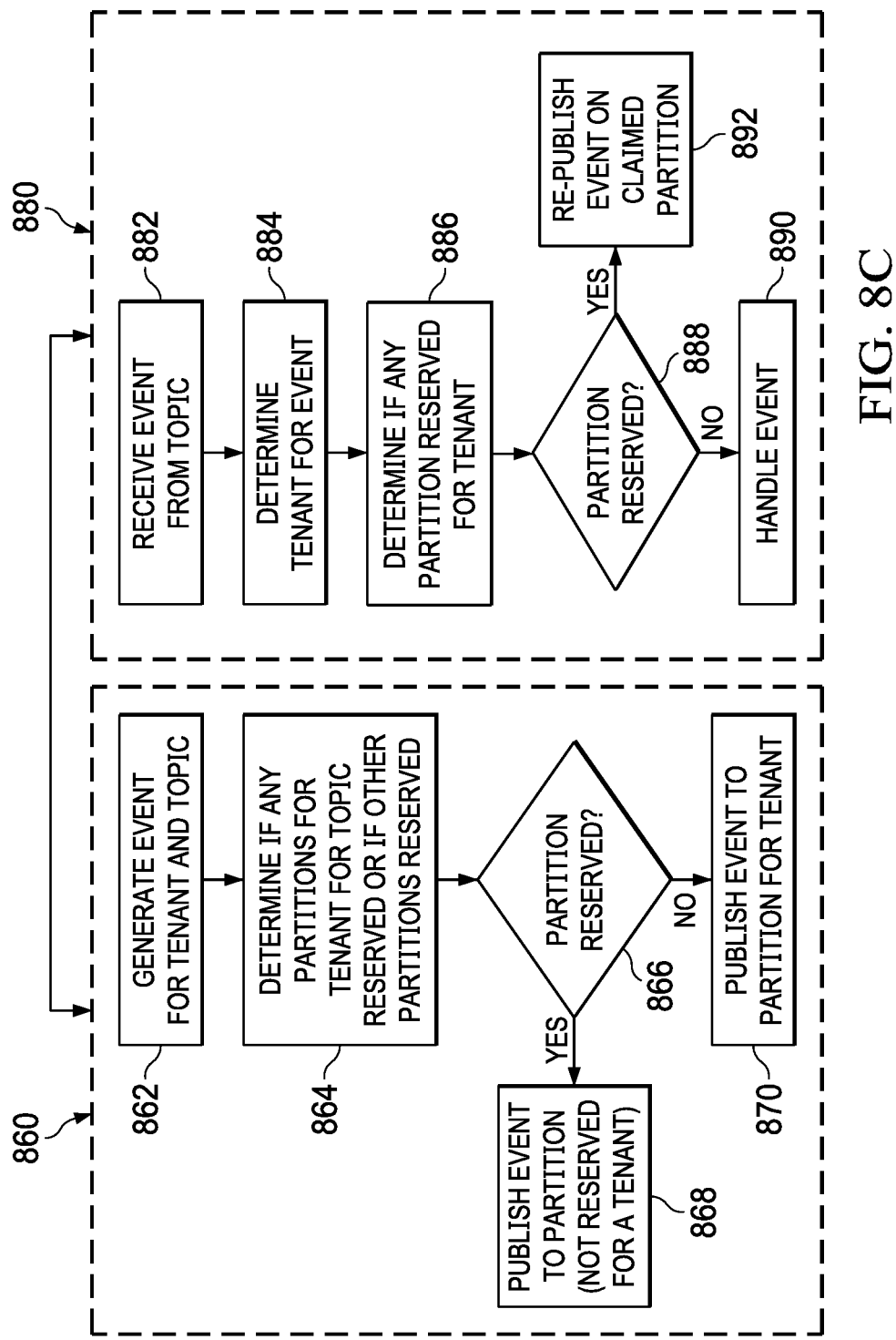

Looking now at FIGS. 8A, 8B and 8C, embodiments of methods for utilizing a service registry of a services infrastructure to facilitate communications between services using an event platform are depicted. Specifically, FIG. 8A depicts one embodiment of a method of a services infrastructure for reserving partitions of a topic for a tenant. In one embodiment, the service infrastructure can create a topic and corresponding partitions for that topic (STEP 802). Specifically, the service infrastructure may determine a number of partitions for the topic and a name of the topic. An entry in the partition registry defining the topic and indicating the number of partitions of the topic can then be created in the partition registry (STEP 804).

In one embodiment, to ensure that all partitions do not become reserved, the service infrastructure may reserve one or more partitions of the created topic as general topics for use with all tenants (STEP 806). A partition reservation entry for that topic in the partition registry identifying those partitions for that topic as reserved as general partitions can be created or updated (STEP 808).

Accordingly, in one embodiment, when the service infrastructure receives a request for a reserved partition for a tenant from a standalone service the service infrastructure may access the partition reservation entries of partition registry to determine if there are any unreserved partitions for that topic (STEP 810). If there are no unreserved partitions for that topic (N branch of STEP 810) a failure response may be returned to the standalone service (STEP 812). Otherwise (Y branch of STEP 810), the service infrastructure may determine one or more partitions of the topic to reserve for the standalone service and return identifiers for these partitions to the standalone service (STEP 814). Additionally, the service infrastructure may create (or update) a partition reservation entry in partition registry indicating that those partitions for that topic are reserved for that tenant (STEP 816).

FIG. 8B depicts one embodiment of a method for the operation for a standalone service using a service infrastructure to communicate using events so that events for the tenant associated with the standalone service are processed by the standalone service. When a standalone service is started in standalone mode the standalone service may access service infrastructure to reserve one or more partitions of a topic to which that standalone service will subscribe (or to which it is subscribed) for the tenant associated with the standalone service (STEP 820). If the standalone service receives a failure notice from the service infrastructure (Y branch of STEP 822) the standalone service may shut down (STEP 824). If however, the standalone service receives identifiers of partitions for the topic from the service infrastructure (Y branch of STEP 822) the standalone service may be configured to monitor those partitions of the topic. At this point, the standalone service may receive events for its associated tenant on the reserved partitions for the topic (BLOCK 826) or may be publish events (BLOCK 828).

Specifically, when receiving events, standalone service may be configured to receive events from the subscribed topic, and in particular may be configured to consume events from the reserved partitions of the topic for its associated tenant (STEP 830). The standalone service can then determine the tenant associated with the received event. If the received event is associated with the tenant associated with the standalone service (Y branch of STEP 832), the standalone service may handle the event (STEP 834). Otherwise, the standalone service can access the partition registry through the service infrastructure to determine if any partitions for that topic are reserved for the determined tenant for the event, or if any other partitions are reserved for any other tenants for the topic (STEP 835).

If there is a partition (e.g., one or more partitions) reserved for the determined tenant for the event (Y branch of STEP 836), the standalone service can publish the event to the reserved partition for that determined tenant for the topic (STEP 838). If however, no partitions for that topic are reserved for the determined tenant (N branch of STEP 836), the service may publish the event to any partition for the topic that is not reserved for another tenant (STEP 840).

When a standalone service is going to publish an event for a tenant in a topic the standalone service may generate an event (STEP 842) and access the service infrastructure to determine if any partitions for that topic are reserved for that tenant, or if any other partitions are reserved for any other tenants for the topic (STEP 844). If there is a partition (e.g., one or more) reserved for that tenant for the topic (Y branch of STEP 846), the standalone service can publish the event to the reserved partition for that tenant for the topic (STEP 850). If however, no partitions for that topic are reserved for that tenant (N branch of STEP 846), the standalone service may publish the event to any partition for the topic that is not reserved for another tenant (STEP 848).

FIG. 8C depicts one embodiment of a method for the operation for a standalone aware service using a service infrastructure to communicate using events so that events for the tenant associated with the standalone service are processed by the standalone service while allowing the standalone aware service to process to process events for other tenants.

When a standalone aware service is going to publish an event for a tenant in a topic (BLOCK 860) the standalone aware service may generate an event for that tenant and topic (STEP 862) and access the service infrastructure to determine if any partitions for that topic are reserved for that tenant, or if any other partitions are reserved for any other tenants for the topic (STEP 864). If there is a partition (e.g., one or more) reserved for that tenant for the topic (Y branch of STEP 866), the standalone aware service can publish the event to the reserved partition for that tenant for the topic (STEP 868). If however, no partitions for that topic are reserved for that tenant (N branch of STEP 866), the standalone aware service may publish the event to any partition for the topic that is not reserved for another tenant (STEP 870).

Similarly, a standalone aware service may consume events (BLOCK 880) from partitions of a topic (e.g., the partitions other than the partitions reserved by specific tenants) (STEP 882). The standalone aware service may then determine a tenant associated with the received event (STEP 884). The standalone aware service can utilize the service infrastructure to determine if any partitions for the topic are reserved for the determined tenant for the event, and the identity of the reserved partitions for that tenant if any partitions are reserved (STEP 886). If no partitions are reserved for the determined tenant (N branch of STEP 888) the standalone aware service may handle the event (STEP 890). If there are partitions reserved for the determined tenant for the event (Y branch of STEP 888), the standalone aware service may re-publish the received event on one of the identified reserved partitions for the tenant (STEP 892).

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A software services platform system, comprising:
    a services platform providing a set of multitenant services by executing a set of instances of each service, the set of multitenant services comprising a pool of instances of the multitenant services adapted to service requests associated with multiple tenants, such that each instance of the pool of instances of the multitenant services is adapted to service requests associated with any of the multiple tenants during execution;
    a services infrastructure for communicating between the set of instances of each of the set of services, the services infrastructure comprising:
    a processor;
    a service registry storing a registration entry for a standalone service instance of a first service for a first tenant executing on a platform distinct from the services platform, the registration entry including first location information associated with the distinct platform on which the standalone service instance is executing and an associated time to live, wherein the standalone service instance of the first service is implemented to only processes requests for the first service for the first tenant and the first location information includes an IP address and a port associated with the standalone service;
    service location data comprising second location information for the first service, the second location information associated with the services platform;
    a service location interface adapted to:
        receive a first request for a first location from an instance of a second service executing on the service platform, the first request identifying the first service and the first tenant;
        access the service registry to determine that the registration entry for the standalone service instance of the first service for the first tenant exists in the service registry;
        determine the first location associated with the standalone service instance of the first service for the first tenant based on the first location information in the registration entry for the standalone service instance of the first service for the first tenant in the service registry;
        return the first location of the standalone service instance of the first service on the platform distinct from the service platform in response to the first request;
        receive a second request for a second location from the instance of the second service executing on the services platform, the second request identifying the first service and a second tenant;
        access the service registry to determine that no registration entry corresponding to the first service for the second tenant exists in the service registry;
        determine the second location associated with second service for the second tenant based on the second location information in the service location data associated with the first service; and
        return the second location for the first service in response to the second request, wherein the second location for the first service is associated with the services platform.

2. The system of claim 1, wherein the services platform is deployed on a cloud based computing platform.

3. The system of claim 1, wherein the first location information includes an IP address or port associated with the distinct platform of the standalone service instance.

4. The system of claim 1, wherein the standalone service instance is adapted to register with the services infrastructure when the standalone service instance is started and the registration entry is created in the service registry by the services infrastructure in response to the registration by the standalone service instance.

5. The system of claim 1, wherein the services infrastructure has a messaging platform, the messaging platform including a set of message queues for the first service, the set of message queues for the first service including a first message queue associated with the first tenant that is associated with the standalone service instance, and wherein each instance of the first service on the services platform is adapted to:
    determine that the standalone service instance of the first service is associated with the first tenant based on the service registry, and
    obtain a first message for the first service associated with the second tenant from at least one of the set of message queues for the first service not including the first message queue associated with the first tenant; and wherein the standalone service instance is adapted to only monitor the first message queue to obtain a second message for the first service associated with the first tenant from the first message queue.

6. The system of claim 1, wherein the services infrastructure comprises an event platform including a topic associated with the first service, wherein the topic is divided into a set of partitions, each partition including events for the topic for the first service, wherein the standalone service instance obtains events only from a first partition of the topic reserved by the standalone service instance, and wherein each of the set of instances of each service is adapted to determine that the first partition of the topic is reserved for the first tenant and to publish events for the topic and the first tenant to the first partition.

7. The system of claim 6, wherein the services infrastructure includes a partition registry storing a partition reservation entry for the topic, the partition reservation entry for the topic comprising an identifier for the first partition associated with the first tenant.

8. A method, comprising:

providing a services platform providing a set of multitenant services by executing a set of instances of each service and a services infrastructure for communicating between the set of instances of each of the set of services, wherein the set of multitenant services comprises a pool of instances of the multitenant services adapted to service requests associated with multiple tenants such that each instance of the pool of instances of the multitenant services is adapted to service requests associated with any of the multiple tenants during execution, and the services infrastructure comprises a service registry storing a registration entry for a standalone service instance of a first service for a first tenant executing on a platform distinct from the services platform, the registration entry including first location information associated with the distinct platform on which the standalone service instance is executing and an associated time to live, wherein the standalone service instance of the first service is implemented to only processes requests for the first service for the first tenant and the first location information includes an IP address and a port associated with the standalone service;

storing service location data comprising second location information for the first service, the second location information associated with the services platform;

at a service location interface:

receiving a first request for a first location from an instance of a second service executing on the service platform, the first request identifying the first service and the first tenant;

accessing the service registry to determine that the registration entry for the standalone service instance of the first service for the first tenant exists in the service registry;

determining the first location associated with the standalone service instance of the first service for the first tenant based on the first location information in the registration entry for the standalone service instance of the first service for the first tenant in the service registry;

returning the first location of the standalone service instance of the first service on the platform distinct from the service platform in response to the first request;

receiving a second request for a second location from the instance of the second service executing on the services platform, the second request identifying the first service and a second tenant;

accessing the service registry to determine that no registration entry corresponding to the first service for the second tenant exists in the service registry;

determining the second location associated with second service for the second tenant based on the second location information in the service location data associated with the first service; and returning the second location for the first service in response to the second request, wherein the second location for the first service is associated with the services platform.

9. The method of claim 8, wherein the services platform is deployed on a cloud based computing platform.

10. The method of claim 8, wherein the first location information includes an IP address or port associated with the distinct platform of the standalone service instance.

11. The method of claim 8, wherein the standalone service instance is adapted to register with the services infrastructure when the standalone service instance is started and the registration entry is created in the service registry by the services infrastructure in response to the registration by the standalone service instance.

12. The method of claim 8, wherein the services infrastructure has a messaging platform, the messaging platform including a set of message queues for the first service, the set of message queues for the first service including a first message queue associated with the first tenant that is associated with the standalone service instance, and wherein each instance of the first service on the services platform is adapted to:

determine that the standalone service instance of the first service is associated with the first tenant based on the service registry, and obtain a first message for the first service associated with the second tenant from at least one of the set of message queues for the first service not including the first message queue associated with the first tenant; and wherein the standalone service instance is adapted to only monitor the first message queue to obtain a second message for the first service associated with the first tenant from the first message queue.

13. The method of claim 8, wherein the services infrastructure comprises an event platform including a topic associated with the first service, wherein the topic is divided into a set of partitions, each partition including events for the topic for the first service, wherein the standalone service instance obtains events only from a first partition of the topic reserved by the standalone service instance, and wherein each of the set of instances of each service is adapted to determine that the first partition of the topic is reserved for the first tenant and to publish events for the topic and the first tenant to the first partition.

14. The method of claim 13, wherein the services infrastructure includes a partition registry storing a partition reservation entry for the topic, the partition reservation entry for the topic comprising an identifier for the first partition associated with the first tenant.

15. A non-transitory computer readable medium, comprising instructions for:
- providing a services platform providing a set of multitenant services by executing a set of instances of each service and a services infrastructure for communicating between the set of instances of each of the set of services, wherein the set of multitenant services comprises a pool of instances of the multitenant services adapted to service requests associated with multiple tenants such that each instance of the pool of instances of the multitenant services is adapted to service requests associated with any of the multiple tenants during execution, and the services infrastructure comprises a service registry storing a registration entry for a standalone service instance of a first service for a first tenant executing on a platform distinct from the services platform, the registration entry including first location information associated with the distinct platform on which the standalone service instance is executing and an associated time to live, wherein the standalone service instance of the first service is implemented to only processes requests for the first service for the first tenant and the first location information includes an IP address and a port associated with the standalone service;
- storing service location data comprising second location information for the first service, the second location information associated with the services platform;
- at a service location interface:
  - receiving a first request for a first location from an instance of a second service executing on the service platform, the first request identifying the first service and the first tenant;
  - accessing the service registry to determine that the registration entry for the standalone service instance of the first service for the first tenant exists in the service registry;
  - determining the first location associated with the standalone service instance of the first service for the first tenant based on the first location information in the registration entry for the standalone service instance of the first service for the first tenant in the service registry;
  - returning the first location of the standalone service instance of the first service on the platform distinct from the service platform in response to the first request;
  - receiving a second request for a second location from the instance of the second service executing on the services platform, the second request identifying the first service and a second tenant;
  - accessing the service registry to determine that no registration entry corresponding to the first service for the second tenant exists in the service registry;
  - determining the second location associated with second service for the second tenant based on the second location information in the service location data associated with the first service; and
  - returning the second location for the first service in response to the second request, wherein the second location for the first service is associated with the services platform.

16. The non-transitory computer readable medium of claim 15, wherein the services platform is deployed on a cloud based computing platform.

17. The non-transitory computer readable medium of claim 15, wherein the first location information includes an IP address or port associated with the distinct platform of the standalone service instance.

18. The non-transitory computer readable medium of claim 15, wherein the standalone service instance is adapted to register with the services infrastructure when the standalone service instance is started and the registration entry is created in the service registry by the services infrastructure in response to the registration by the standalone service instance.

19. The non-transitory computer readable medium of claim 15, wherein the services infrastructure has a messaging platform, the messaging platform including a set of message queues for the first service, the set of message queues for the first service including a first message queue associated with the first tenant that is associated with the standalone service instance, and wherein each instance of the first service on the services platform is adapted to:
- determine that the standalone service instance of the first service is associated with the first tenant based on the service registry, and
- obtain a first message for the first service associated with the second tenant from at least one of the set of message queues for the first service not including the first message queue associated with the first tenant; and
- wherein the standalone service instance is adapted to only monitor the first message queue to obtain a second message for the first service associated with the first tenant from the first message queue.

20. The non-transitory computer readable medium of claim 15, wherein the services infrastructure comprises an event platform including a topic associated with the first service, wherein the topic is divided into a set of partitions, each partition including events for the topic for the first service, wherein the standalone service instance obtains events only from a first partition of the topic reserved by the standalone service instance, and
- wherein each of the set of instances of each service is adapted to determine that the first partition of the topic is reserved for the first tenant and to publish events for the topic and the first tenant to the first partition.

21. The non-transitory computer readable medium of claim 20, wherein the services infrastructure includes a partition registry storing a partition reservation entry for the topic, the partition reservation entry for the topic comprising an identifier for the first partition associated with the first tenant.

* * * * *